(12) United States Patent
Agarwal et al.

(10) Patent No.: US 8,831,645 B2
(45) Date of Patent: Sep. 9, 2014

(54) METHODS, SYSTEMS, AND COMPUTER READABLE MEDIA FOR PROVIDING GEO-LOCATION PROXIMITY UPDATES TO A PRESENCE SYSTEM

(75) Inventors: Devesh Agarwal, Raleigh, NC (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 491 days.

(21) Appl. No.: 12/624,974

(22) Filed: Nov. 24, 2009

(65) Prior Publication Data

US 2010/0137002 A1 Jun. 3, 2010

Related U.S. Application Data

(60) Provisional application No. 61/117,547, filed on Nov. 24, 2008.

(51) Int. Cl.
*H04W 24/00* (2009.01)
*H04L 29/08* (2006.01)
*H04W 4/02* (2009.01)

(52) U.S. Cl.
CPC ............... *H04W 4/02* (2013.01); *H04L 67/18* (2013.01); *H04L 67/24* (2013.01)
USPC .... 455/457; 455/435.1; 455/41.2; 455/456.1; 455/519; 370/352; 370/338

(58) Field of Classification Search
USPC ........... 455/404.2, 414.2, 415, 420, 424, 433, 455/456, 456.1–457, 414.1–414.4, 455/432.1–435.3; 370/352–356, 328, 338
See application file for complete search history.

(56) References Cited

U.S. PATENT DOCUMENTS

| 5,341,680 | A | | 8/1994 | Smart et al. |
| 5,475,651 | A | * | 12/1995 | Bishop et al. ................... 367/88 |
| 5,579,371 | A | | 11/1996 | Aridas et al. |
| 5,610,969 | A | | 3/1997 | McHenry et al. |
| 5,774,668 | A | | 6/1998 | Choquier et al. |
| 5,812,639 | A | | 9/1998 | Bartholomew et al. |
| 5,999,525 | A | | 12/1999 | Krishnaswamy et al. |
| 6,091,957 | A | | 7/2000 | Larkins et al. |

(Continued)

FOREIGN PATENT DOCUMENTS

| CN | ZL 200680049126.1 | 12/2012 |
| EP | 1 511 267 A1 | 3/2005 |

(Continued)

OTHER PUBLICATIONS

Final Official Action for U.S. Appl. No. 11/077,711, (Jun. 23, 2010).

(Continued)

*Primary Examiner* — Sharad Rampuria
(74) *Attorney, Agent, or Firm* — Jenkins, Wilson, Taylor & Hunt, P.A.

(57) ABSTRACT

The subject matter described herein relates to methods, systems, and computer readable media for providing geo-location proximity updates to a presence system. One method includes intercepting a mobility management message associated with a mobile subscriber, wherein the mobility management message includes one or more network specific identifiers (NSIDs). A geo-location proximity descriptor is determined based on the one or more NSIDs. The geo-location proximity descriptor is communicated to a presence system.

48 Claims, 13 Drawing Sheets

(56) References Cited

U.S. PATENT DOCUMENTS

| | | | |
|---|---|---|---|
| 6,091,959 A | 7/2000 | Souissi et al. | |
| 6,094,573 A | 7/2000 | Heinonen et al. | |
| 6,115,754 A | 9/2000 | Landgren | |
| 6,119,014 A | 9/2000 | Alperovich et al. | |
| 6,122,510 A | 9/2000 | Granberg | |
| 6,125,177 A | 9/2000 | Whittaker | |
| 6,128,304 A | 10/2000 | Gardell et al. | |
| 6,134,314 A | 10/2000 | Dougherty et al. | |
| 6,134,432 A | 10/2000 | Holmes et al. | |
| 6,181,937 B1 | 1/2001 | Joensuu | |
| 6,215,790 B1 | 4/2001 | Voit et al. | |
| 6,219,551 B1 | 4/2001 | Hentilä et al. | |
| 6,252,952 B1 | 6/2001 | Kung et al. | |
| 6,301,609 B1 | 10/2001 | Aravamudan et al. | |
| 6,304,565 B1 | 10/2001 | Ramamurthy | |
| 6,324,183 B1 | 11/2001 | Miller et al. | |
| 6,333,931 B1 | 12/2001 | LaPier et al. | |
| 6,363,411 B1 | 3/2002 | Dugan et al. | |
| 6,373,930 B1 | 4/2002 | McConnell et al. | |
| 6,424,647 B1 | 7/2002 | Ng et al. | |
| 6,430,176 B1 | 8/2002 | Christie, IV | |
| 6,446,127 B1 | 9/2002 | Schuster et al. | |
| 6,453,034 B1 | 9/2002 | Donovan et al. | |
| 6,456,845 B1 | 9/2002 | Drum et al. | |
| 6,470,179 B1 | 10/2002 | Chow et al. | |
| 6,515,997 B1 | 2/2003 | Feltner et al. | |
| 6,564,261 B1 | 5/2003 | Gudjonsson et al. | |
| 6,571,094 B1 | 5/2003 | Begeja et al. | |
| 6,611,516 B1 | 8/2003 | Pirkola et al. | |
| 6,639,981 B1 | 10/2003 | Dunn, Jr. et al. | |
| 6,704,287 B1 | 3/2004 | Moharram | |
| 6,718,178 B1 | 4/2004 | Sladek et al. | |
| 6,747,970 B1 | 6/2004 | Lamb et al. | |
| 6,760,343 B1 | 7/2004 | Krishnamurthy et al. | |
| 6,968,052 B2 | 11/2005 | Wullert, II | |
| 7,039,040 B1 | 5/2006 | Burg | |
| 7,058,036 B1 | 6/2006 | Yu et al. | |
| 7,146,181 B2 | 12/2006 | Schaedler et al. | |
| 7,171,216 B1* | 1/2007 | Choksi | 455/456.1 |
| 7,209,968 B1 | 4/2007 | Secer | |
| 7,260,207 B2 | 8/2007 | Marsico | |
| 7,359,724 B2* | 4/2008 | Torvinen | 455/518 |
| 7,701,925 B1 | 4/2010 | Mason et al. | |
| 7,751,825 B2* | 7/2010 | Gogic | 455/456.1 |
| 7,840,636 B2 | 11/2010 | Knauerhase et al. | |
| 7,844,055 B2* | 11/2010 | Mukherjee et al. | 380/250 |
| 7,870,196 B2 | 1/2011 | Costa Requena | |
| 7,903,637 B2 | 3/2011 | Moore et al. | |
| 7,907,713 B2 | 3/2011 | Khadri | |
| 7,924,787 B2* | 4/2011 | Lee | 370/331 |
| 7,933,608 B2* | 4/2011 | Tejani et al. | 455/456.1 |
| 8,019,335 B2* | 9/2011 | Kallio | 455/426.1 |
| 8,108,345 B2 | 1/2012 | Cox et al. | |
| 8,130,931 B2 | 3/2012 | Murphy et al. | |
| 8,176,086 B2 | 5/2012 | John et al. | |
| 8,190,884 B2 | 5/2012 | Alroy et al. | |
| 8,204,052 B2 | 6/2012 | Baldwin et al. | |
| 8,204,194 B2 | 6/2012 | Hyerle | |
| 8,234,559 B2 | 7/2012 | Cox et al. | |
| 8,422,487 B2* | 4/2013 | Mason et al. | 370/352 |
| 8,577,004 B2* | 11/2013 | Hans et al. | 379/201.12 |
| 2001/0024950 A1* | 9/2001 | Hakala et al. | 455/406 |
| 2001/0031641 A1 | 10/2001 | Ung et al. | |
| 2001/0034224 A1 | 10/2001 | McDowell et al. | |
| 2001/0034237 A1* | 10/2001 | Garahi | 455/456 |
| 2002/0058507 A1 | 5/2002 | Valentine et al. | |
| 2002/0061746 A1 | 5/2002 | Jo et al. | |
| 2002/0078209 A1 | 6/2002 | Peng | |
| 2002/0086672 A1 | 7/2002 | McDowell et al. | |
| 2002/0147845 A1* | 10/2002 | Sanchez-Herrero et al. | 709/245 |
| 2002/0187781 A1 | 12/2002 | Furlong | |
| 2002/0193127 A1 | 12/2002 | Martschitsch | |
| 2003/0026289 A1 | 2/2003 | Mukherjee et al. | |
| 2003/0031160 A1 | 2/2003 | Gibson Ang et al. | |
| 2003/0065788 A1 | 4/2003 | Salomaki | |
| 2003/0073440 A1 | 4/2003 | Mukherjee et al. | |
| 2003/0100326 A1 | 5/2003 | Grube et al. | |
| 2003/0148779 A1 | 8/2003 | Aravamudan et al. | |
| 2003/0177281 A1 | 9/2003 | McQuillan et al. | |
| 2003/0235180 A1 | 12/2003 | Oprescu-Surcobe et al. | |
| 2004/0003037 A1 | 1/2004 | Fukimoto et al. | |
| 2004/0015569 A1 | 1/2004 | Lonnfors et al. | |
| 2004/0047303 A1 | 3/2004 | Fernandez et al. | |
| 2004/0062383 A1 | 4/2004 | Sylvain | |
| 2004/0125790 A1 | 7/2004 | Hiller et al. | |
| 2004/0133641 A1 | 7/2004 | McKinnon et al. | |
| 2004/0153506 A1 | 8/2004 | Ito et al. | |
| 2004/0193686 A1 | 9/2004 | Blagsvedt et al. | |
| 2004/0203923 A1 | 10/2004 | Mullen | |
| 2005/0027867 A1 | 2/2005 | Mueller et al. | |
| 2005/0050157 A1 | 3/2005 | Day | |
| 2005/0070310 A1 | 3/2005 | Caspi et al. | |
| 2005/0074101 A1 | 4/2005 | Moore et al. | |
| 2005/0091387 A1 | 4/2005 | Abe | |
| 2005/0136952 A1 | 6/2005 | Zabawskyj et al. | |
| 2005/0143111 A1 | 6/2005 | Fitzpatrick et al. | |
| 2005/0143135 A1 | 6/2005 | Brems et al. | |
| 2005/0164682 A1 | 7/2005 | Jenkins et al. | |
| 2005/0202836 A1 | 9/2005 | Schaedler et al. | |
| 2005/0228895 A1 | 10/2005 | Karunamurthy et al. | |
| 2005/0266859 A1 | 12/2005 | Tejani et al. | |
| 2006/0068762 A1* | 3/2006 | Baldwin et al. | 455/412.1 |
| 2006/0112177 A1 | 5/2006 | Barkley et al. | |
| 2006/0140189 A1 | 6/2006 | Wu et al. | |
| 2006/0167978 A1 | 7/2006 | Ozugur et al. | |
| 2006/0244638 A1* | 11/2006 | Lettau | 340/995.1 |
| 2006/0246880 A1 | 11/2006 | Baldwin et al. | |
| 2007/0127676 A1 | 6/2007 | Khadri | |
| 2007/0282911 A1 | 12/2007 | Bantukul et al. | |
| 2008/0137832 A1 | 6/2008 | Heinze et al. | |
| 2009/0069047 A1* | 3/2009 | Russell et al. | 455/558 |
| 2009/0089322 A1* | 4/2009 | Naaman | 707/103 R |
| 2009/0233629 A1* | 9/2009 | Jayanthi | 455/457 |
| 2009/0299985 A1* | 12/2009 | Boberg et al. | 707/4 |
| 2010/0017472 A1 | 1/2010 | Benedyk et al. | |
| 2010/0205248 A1 | 8/2010 | Mason et al. | |
| 2013/0196601 A1* | 8/2013 | Bobrow et al. | 455/41.2 |

FOREIGN PATENT DOCUMENTS

| | | |
|---|---|---|
| EP | 1 269 764 B1 | 7/2008 |
| JP | 2005057709 | 3/2005 |
| WO | WO 99/14910 | 3/1999 |
| WO | WO 00/35155 A1 | 6/2000 |
| WO | WO 01/56308 A2 | 8/2001 |
| WO | WO 01/72055 A2 | 9/2001 |
| WO | WO 03/032616 A1 | 4/2003 |
| WO | WO 2005/086966 A2 | 9/2005 |
| WO | WO 2005/086972 A2 | 9/2005 |
| WO | WO 2006/118755 A2 | 11/2006 |
| WO | WO 2007/050591 A2 | 5/2007 |
| WO | WO 2008/036645 A2 | 3/2008 |
| WO | WO 01/45342 A2 | 6/2011 |

OTHER PUBLICATIONS

Final Official Action for U.S. Appl. No. 11/120,324 (Jun. 22, 2010).
Communication purusant to Article 94(3) EPC for European application No. 08153801.9 (May 28, 2010).
Commonly assigned, co-pending U.S. Appl. No. for "Presence Registration and Routing Node," filed Apr. 19, 2010, Unpublished.
Interview Summary for U.S. Appl. No. 11/120,324 (Mar. 11, 2010).
Interview Summary for U.S. Appl. No. 11/077,711 (Mar. 4, 2010).
European Search Report for European application No. 08153801.9 (Jan. 27, 2010).
Notification of Transmittal of the International Search Report and the Written Opinion of the International Searching Authority, or the Declaration of PCT/US2009/047391 (Jan. 25, 2010).
Official Action for U.S. Appl. No. 11/586,423 (Jan. 6, 2010).
Official Action for U.S. Appl. No. 11/077,711 (Dec. 24, 2009).
Official Action for U.S. Appl. No. 11/120,324 (Oct. 19, 2009).
Interview Summary for U.S. Appl. No. 11/586,423 (Oct. 15, 2009).

(56) References Cited

OTHER PUBLICATIONS

Notice of Allowance and Fee(s) Due for U.S. Appl. No. 09/627,253 (Jul. 24, 2009).
Commonly-assigned, co-pending U.S. Appl. No. 12/484,857 for "Methods, Systems, and Computer Readable Media for Providing Presence Data From Multiple Presence Information Providers," filed Jun. 15, 2009, Unpublished.
Ex parte Quayle for U.S. Appl. No. 09/627,253 (May 7, 2009).
Communication regarding the expiry of the time limit within which notice of opposition may be filed for European Application No. 01920654.9 dated May 7, 2009.
Official Action for U.S. Appl. No. 11/586,423 (Apr. 29, 2009).
Final Official Action for U.S. Appl. No. 11/077,711 (Mar. 16, 2009).
Official Action for U.S. Appl. No. 11/120,324 (Jan. 21, 2009).
Notice of Abandonment for U.S. Appl. No. 09/627,253 (Nov. 12, 2008).
Office Action for U.S. Appl. No. 11/586,423 (Jul. 25, 2008).
Office Action for U.S. Appl. No. 11/077,711 (Jun. 26, 2008).
Notification of Transmittal of the International Search Report and the Written Opinion of the International Searching Authority, or the Declaration for International Application No. PCT/US06/41451 (Jul. 7, 2008).
Office Action for U.S. Appl. No. 11/120,324 (Apr. 16, 2008).
Final Official Action for U.S. Appl. No. 09/627,253 (Apr. 4, 2008).
Notification of Transmittal of the International Search Report and the Written Opinion of the International Searching Authority, or the Declaration for International Application No. PCT/US06/13404 (Oct. 5, 2007).
Official Action for U.S. Appl. No. 09/627,253 (Sep. 20, 2007).
Restriction/Election Requirement for U.S. Appl. No. 09/627,253 (Jun. 14, 2007).
Communication pursuant to Article 96(2) EPC corresponding to European application No. 01 920 654.9 dated May 2, 2007.
Notice of Panel Decision for U.S. Appl. No. 09/627,253 (Apr. 2, 2007).
Notice of Allowance and Fee(s) Due for U.S. Appl. No. 10/798,924 (Oct. 3, 2006).
Official Action for U.S. Appl. No. 09/627,253 (Aug. 25, 2006).
Notification of Transmittal of the International Search Report and the Written Opinion of the International Searching Authority, or the Declaration for International Application No. PCT/US05/08258 (Aug. 16, 2006).
Notification of Transmittal of the International Search Report and the Written Opinion of the International Searching Authority, or the Declaration for International Application No. PCT/US05/08307 (Mar. 13, 2006).
Official Action for U.S. Appl. No. 10/798,924 (Feb. 23, 2006).
Wideberg et al., "Deriving Traffic Data From a Cellular Network," World Congress on Intelligent Transport System and Services. World Congress on Intelligent Transport System and Services (13). No. 13. Londres, UK. Ertico. (2006).
Advisory Action for U.S. Appl. No. 09/627,253 (Dec. 28, 2005).
Final Official Action for U.S. Appl. No. 09/627,253 (Jun. 2, 2005).
Notification of Transmittal of the International Search Report and the Written Opinion of the International Searching Authority, or Declaration for International Application No. PCT/US05/08307 (Mar. 11, 2005).
Klyne, et al., "Common Presence and Instant Messaging (CPIM): Message," Network Working Group, RFC 3862, p. 1-23 (Aug. 2004).
Peterson, J., "Common Profile for Instant Messaging (CPIM)," Network Working Group, RFC 3860 (Aug. 2004).
Official Action for U.S. Appl. No. 09/627,253 (May 19, 2004).
Restriction/Election Requirement for U.S. Appl. No. 09/627,253 (Jan. 9, 2004).
Campbell et al., "SIP Instant Message Sessions," p. 1 (Jun. 30, 2003).
Official Action for U.S. Appl. No. 09/627,253 (Apr. 28, 2003).
Interview Summary for U.S. Appl. No. 09/627,253 (Jan. 30, 2003).
Campbell et al., "Session Initiation Protocol (SIP) Extension for Instant Messaging," pp. 1-15 (Dec. 2002).
Rosenberg et al., "SIP: Session Initiation Protocol," Network Working Group, FRC 3261 (Jun. 2002).
"$3^{rd}$ Generation Partnership Project; Technical Specification Group Services and Systems Aspects; Network Architecture (Release 5)," 3GPP TS 23.002, V5.7.0, p. 1-50, (Jun. 2002).
Commonly-assigned, co-pending U.S. Appl. No. 09/627,253 for "Presence Registration and Routing Node," filed Jul. 28, 2000, Unpublished.
Sugano et al., "Presence Information Data Format for IMPP," Internet draft, draft-ietf-impp-pidf-01.text, Network Working Froup, p. 1-17, (Mar. 10, 2000).
Aggarwal et al., "Transport Protocol for Presence Information/Instant Messaging," Internet draft, draft-ietf-impp-pitp-mitp-01, Network Working Group, p. 1-21, (Mar. 9, 2000).
Day et al., "A Model for Presence and Instant Messaging," Request for Comments: 2778, Network Working Group, p. 1-17, (Feb. 2000).
Day et al., "Instant Messaging/Presence Protocol Requirements," Request for Comments: 2779, Network Working Group, p. 1-26, (Feb. 2000).
Stracke, J., "Message Information Data Format," Internet draft, draft-ietf-impp-midf-01.txt, Network Working Group, p. 1-4, (Jan. 19, 2000).
Tekelec, "IP7 Secure Gateway Release 1.0", Tekelec Release Documentation, 910-2046-01 Revision A (Nov. 1999).
Handley et al., "SIP: Session Initiation Protocol," Request for Comments: 2543, Network Working Group, p. 1-111, (Mar. 1999).
Saraswat et al., "The Presence Protocol," Internet-Draft, draft-saraswat-presenceprotocol-00.txt, p. 1-15 (Feb. 26, 1999).
Rosenberg et al., "SIP for Presence," IETF, draft-rosenberg-sip-pip-00.txt, p. 1-22 (Nov. 13, 1998).
Handley et al., "SDP: Session Description Protocol," Request for Comments: 2327, Network Working Group, p. 1-42, (Apr. 1998).
Tekelec, "Feature Guide Eagle STP," P/N 910-1225-01 Revision B (Jan. 1998).
Tekelec, "Feature Guide LNP LSMS," P/N 910-1598-01 Revision A (Jan. 1998).
Official Action for U.S. Appl. No. 12/762,908 (Apr. 14, 2011).
Chinese Offical Action for Chinese Patent Application No. 200680049126.1 (Feb. 24, 2011).
Supplemental Notice of Allowability for U.S. Appl. No. 11/077,711 (Feb. 16, 2011).
Interview Summary for U.S. Appl. No. 11/120,324 (Mar. 1, 2011).
Official Action for U.S. Appl. No. 11/120,324 (Mar. 1, 2011).
Interview Summary for U.S. Appl. No. 11/077,711 (Dec. 21, 2010).
Notice of Allowance and Fee(s) Due for U.S. Appl. No. 11/077,711 (Dec. 20, 2010).
Interview Summary for U.S. Appl. No. 11/077,711 (Dec. 3, 2010).
Notice of Allowance and Fee(s) Due for U.S. Appl. No. 11/586,423 (Oct. 6, 2010).
European Search Report for European application No. 06826548.7 (Sep. 3, 2010).
Notice of Granting Patent Right for Invention for Chinese Patent Application No. 200680049126.1 (Aug. 6, 2012).
Non-Final Official Action for U.S. Appl. No. 12/762,908 (Apr. 25, 2012).
Communication under Rule 71(3) EPC for European Application No. 08 153 801.9 (Apr. 23, 2012).
Notice of Allowance and Fee(s) Due for U.S. Appl. No. 11/120,324 (Feb. 22, 2012).
Noting of loss of rights pursuant to Rule 112(1) EPC for European Application No. 09763799.5 (Feb. 7, 2012).
Applicant-Initiated Interview Summary for U.S. Appl. No. 12/762,908 (Jan. 9, 2012).
Second Office Action of Chinese Patent Application No. 200680049126.1 (Dec. 6, 2011).
Final Official Action for U.S. Appl. No. 12/762,908 (Nov. 9, 2011).
Non-Final Official Action for U.S. Appl. No. 11/120,324 (Nov. 1, 2011).

(56) References Cited

OTHER PUBLICATIONS

Extended European Search Report for European Application No. 09763799.5 (Oct. 14, 2011).
Supplementary European Search Report for European application No. 05725442.7 (Aug. 16, 2011).
Interview Summary for U.S. Appl. No. 12/762,908 (Jun. 28, 2011).
Non-Final Official Action for U.S. Appl. No. 12/484,857 (Aug. 30, 2012).
Interview Summary for U.S. Appl. No. 12/762,908 (Aug. 23, 2012).
Communication pursuant to Article 94(3) EPC for European Application No. 06 826 548.7 (Feb. 20, 2014).
Notice of Grant for Indian Patent Application No. 2580/CHENP/2008 (Dec. 3, 2013).
Examination Report for Indian Patent Application No. 2580/CHENP/2008 (Oct. 31, 2013).
Non-Final Office Action for U.S. Appl. No. 12/484,857 (Oct. 21, 2013).
First Examination Report for Indian Application No. 2580/CHENP/2008 (Nov. 29, 2012).
Notice of Allowance and Fee(s) Due for U.S. Appl. No. 12/762,908 (Dec. 18, 2012).
Non-Final Office Action for U.S. Appl. No. 12/484,857 (May 17, 2013).

\* cited by examiner

NSID-to-GeoLoc Proximity Translation database — 206

| Subscriber ID (IMSI/TMSI/MSISDN) | Last Known MSC_Address, VLR_Number, SGSN_Address, SGSN_Number, Location_Area_ID (LAC), Cell_ID (CI) | Last Known Timestamp | Avg. Speed | Movement Descriptor |
|---|---|---|---|---|
| 9193803814 | 1214 | 13:15:05 - 8/8/2008 | 1.5mph | Jogging |
| 9193803817 | xxxx | 13:16:05 - 8/8/2008 | 45mph | Motoring |
| 9193803815 | xxxx | 13:16:02 - 8/8/2008 | 0mph | Stationary |

METHODS, SYSTEMS, AND COMPUTER READABLE MEDIA FOR PROVIDING GEO-LOCATION PROXIMITY UPDATES TO A PRESENCE SYSTEM

PRIORITY CLAIM

This application claims the benefit of U.S. Provisional Patent Application Ser. No. 61/117,547, filed Nov. 24, 2008; the disclosure of which is incorporated herein by reference in its entirety.

TECHNICAL FIELD

The subject matter described herein relates to updating a presence system. More particularly, the subject matter described herein relates to providing geo-location proximity updates to a presence system based on mobile network information.

BACKGROUND

Mobile communications networks routinely generate and exchange network-specific identifying information between mobile handsets and various network entities. Network specific identifiers (NSIDs) may include information such as a Cell ID identifying the network cell in which the mobile user is currently operating or an MSC address identifying the MSC currently serving the mobile subscriber. NSIDs may not provide a precise location of a particular mobile subscriber because the network specific resource identified by the NSID may be shared by multiple users spread over a given geographical area. For example, the accuracy provided by a Cell ID can be as good as a few hundred meters in urban areas or as poor as 35 km in suburban areas and rural zones, depending on the range of the network base station serving the handset at the time of positioning.

In addition to geographically imprecise information (i.e., NSIDs), mobile communications networks also routinely generate and exchange location information that provides a precise location of mobile users. For example, a mobile handset equipped with a global positioning system (GPS) receiver may determine its geographical position to within an accuracy of +/−5 meters using information provided by multiple orbiting GPS satellites.

In addition to NSIDs and location information, mobile subscribers may generate and exchange presence information with a presence system for indicating the mobile subscriber's status to one or more associated watchers (aka, watching presentities). Typically, presence information is information indicating whether someone's availability to communicate (e.g., via IM). Presence information is also typically expressed in a format that is more easily understood by watchers because watchers are typically other human beings (e.g., friends in an IM list).

One problem associated with using NSID information as input to a presence systems is that NSID information (e.g., MSC identifier, Cell ID, Location Area, etc.) has little or no meaning to a presence system user (e.g., a watcher). Furthermore, indicating to a friend that one is located at 35° 59'N 78° 54'W may be significantly less useful than indicating that one is located "near Southpoint Mall." Likewise, indicating that one has moved from Cell ID 1214 to Cell ID 1215 is significantly less useful than indicating that one is jogging Downtown.

Another problem associated with presence system geo-location information relates to the distribution of precise geo-location information, such as precise GPS coordinate information once it has been obtained or ascertained. In certain situations, the distribution of precise GPS coordinates (e.g., geo-location coordinates accurate to within a few meters) to watchers may not be desired. For example, a parent may not want for their child to willingly (or unwittingly) allow a watcher to obtain such precise geo-location information associated with their child.

Accordingly, there exists a need for methods, systems, and computer readable media for interworking between NSIDs, location information, and presence systems.

SUMMARY

The subject matter described herein relates to methods, systems, and computer readable media for providing geo-location proximity updates to a presence system. One method includes intercepting a mobility management message associated with a mobile subscriber, wherein the mobility management message includes one or more network specific identifiers (NSIDs). A geo-location proximity descriptor is determined based on the one or more NSIDs. The geo-location proximity descriptor is then communicated to a presence system.

According to another aspect, a method for translating location information into a geo-location proximity descriptor is provided. One method includes intercepting a signaling message associated with a mobile subscriber, wherein the mobility management message includes location information. A geo-location proximity descriptor is determined based on the location information. The geo-location proximity descriptor is communicated to a presence system.

The subject matter described herein for providing geo-location proximity updates to a presence system can be implemented using a computer readable medium having stored thereon instructions that when executed by a processor of a computer control the computer to perform steps. Exemplary computer readable media suitable for implementing the subject matter described herein include non-transitory computer readable media, such as chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings of which:

FIG. 6 is diagram of exemplary NSID-to-movement descriptor translation database entries according to an embodiment of the subject matter described herein;

DETAILED DESCRIPTION

The subject matter described herein includes methods, systems, and computer readable media for providing geo-location proximity updates to a presence system. As mentioned above, there are two types of information exchanged between mobile communications network entities: NSIDs and location information. Because NSIDs are directed to identifying logical network resources or network service areas, they only indirectly associated with the location of mobile subscribers. Location information, in contrast, is directed to identifying the location of mobile subscribers and is therefore directly associated with the location of mobile subscribers. Furthermore, because the types of messages and specific network entities involved in NSID-to-geo-location proximity descriptor and location information-to-geo-location proximity descriptor are typically different and separate, each type of translation will be discussed separately for clarity of discussion.

NSID Translation

Figure 1:
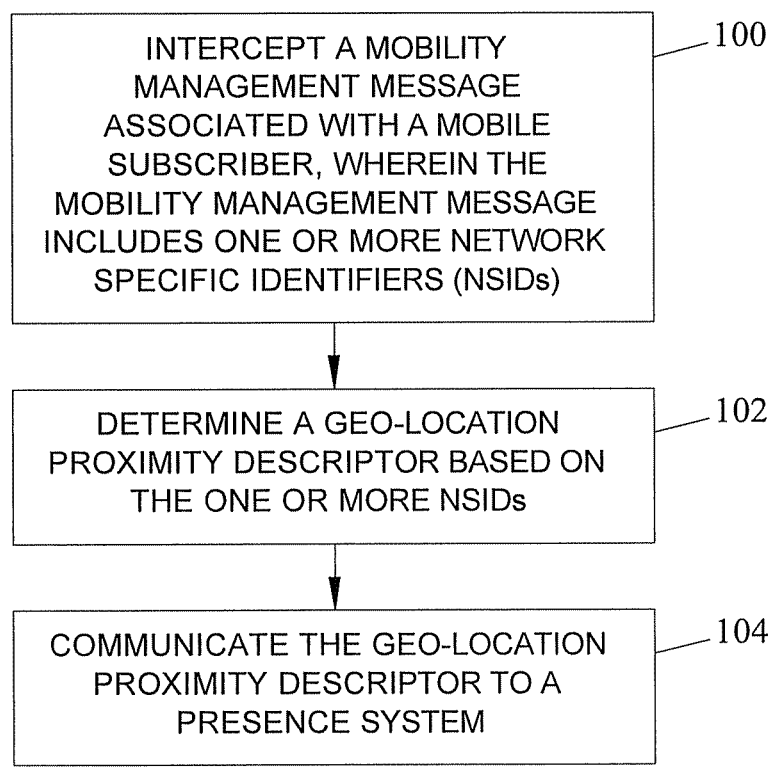
FIG. 1 is flow chart illustrating exemplary steps for associating one or more NSIDs to a geo-location proximity descriptor and providing the descriptor to a presence system according to an embodiment of the subject matter described herein.

FIG. 1 is flow chart illustrating exemplary steps for associating one or more NSIDs to a geo-location proximity descriptor and providing the descriptor to a presence system according to an embodiment of the subject matter described herein. Referring to FIG. 1, in step 100, a mobility management message associated with a mobile subscriber is intercepted, where the mobility management message includes one or more network specific identifiers (NSIDs). As will be described in greater detail below with respect to FIGS. 2-4, mobility management messages may be intercepted in a 2 G communications network via an SS7 signaling link, an A-interface, or an A-bis interface. An exemplary type of mobility management message that may be intercepted includes a MAP Update_Location message. Exemplary types of NSIDs that may be includes in a mobility management message include an MSC address, a VLR number, an SGSN address, an SGSN number, a Location Area ID, or a cell ID. It will be appreciated that in alternate embodiments, such as IP Multimedia Subsystem (IMS) and Long Term Evolution (LTE) network embodiments, mobility management signaling messages such as DIAMETER messages may be intercepted and processed in a similar manner to provide geo-location proximity translation functionality of the present invention.

In step 102, a geo-location proximity descriptor is determined based on the one or more NSIDs. For example, the SGSN address 9191110001 may be associated with geo-location proximity descriptor "West Chapel Hill," or Cell ID 1214 may be associated with geo-location proximity descriptor "near Southpoint Mall." As a result, NSIDs, which have no meaning to a watching presentity and which are not provided to a presence system, may be translated into a format usable by a presence system. It is understood that NSIDs may not provide a precise geographic location of a mobile user, but rather may indicate an imprecise geographic area in which the mobile user may be found. The mapping or associating of a "precise" NSID (e.g., MSC ID, Cell ID, etc.) or a precise geo-location identifier (e.g., GPS coordinates) to an imprecise geographic location is referred to herein as a "fuzzy" location determination. Thus, in step 102, a translation may be performed between a first type of precise data (i.e., one or more NSIDs) and a second type of fuzzy data (geo-location proximity descriptor).

In step 104, the geo-location proximity descriptor is communicated to a presence system. For example, a presence update message including the geo-location proximity descriptor determined in step 102 may be communicated to a presence server. Because the geo-location proximity descriptor included in the presence update message is understandable by the presence server, the presence server is able to indicate that the location of mobile user associated with the mobility management message intercepted in step 100 is "West Chapel Hill" or "near Southpoint Mall."

Figure 2:
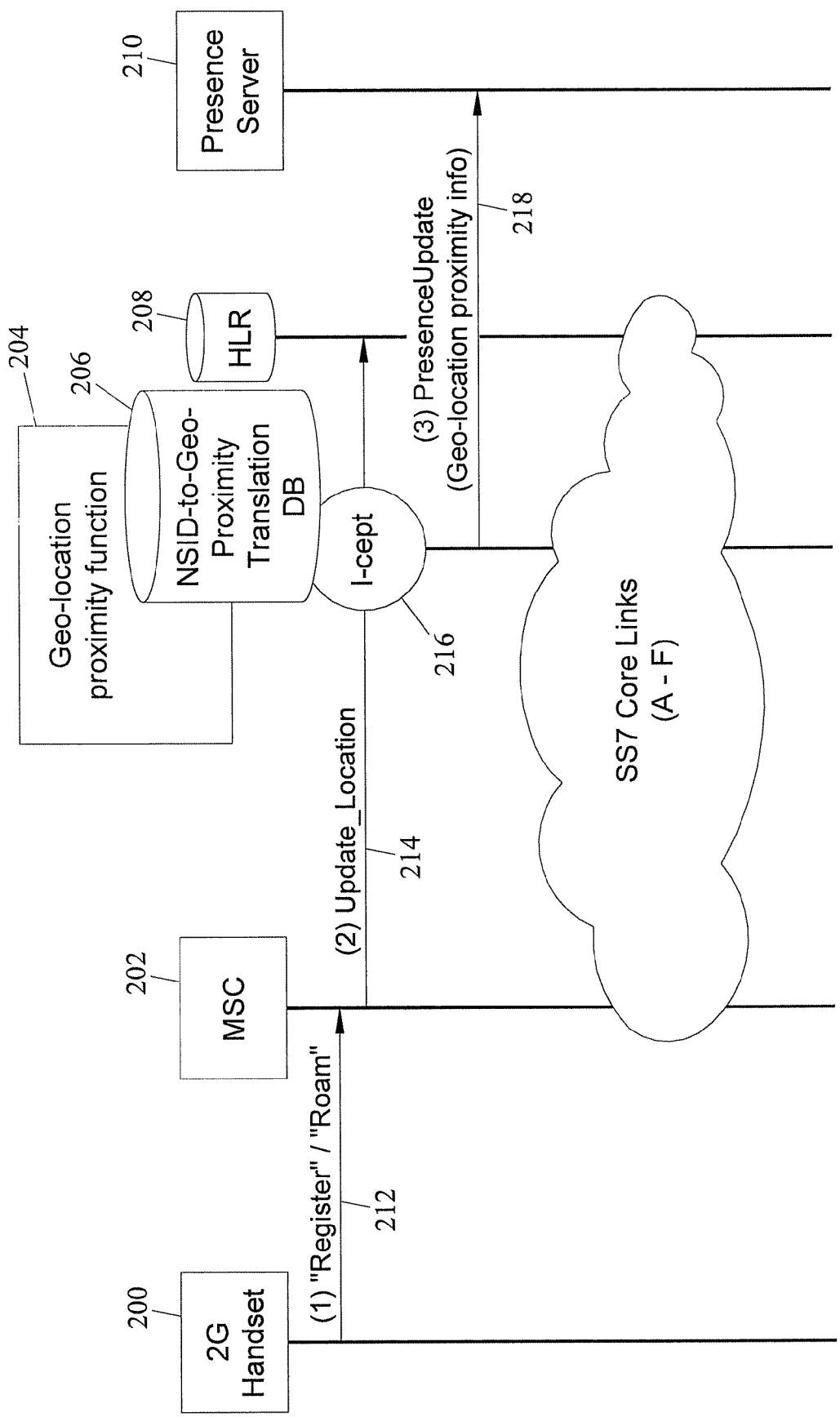
FIG. 2 is network diagram illustrating an exemplary 2 G communications network and exemplary messaging for intercepting one or more NSIDs via a signaling link, associating the one or more NSIDs with a geo-location proximity descriptor and providing the descriptor to a presence system according to an embodiment of the subject matter described herein.

FIG. 2 is network diagram illustrating an exemplary 2 G communications network and exemplary messaging for intercepting one or more NSIDs via a signaling link, associating the one or more NSIDs with a geo-location proximity descriptor, and providing the descriptor to a presence system according to an embodiment of the subject matter described herein. Referring to FIG. 2, the exemplary 2G mobile communications network may include one of a Global System for Mobile Communications (GSM), Interim Standard 41 (IS- 41), IS-95, IS-136, integrated digital enhanced network (iDEN), personal digital cellular (PDC), or a Personal Communications Services (PCS) network. FIG. 2 includes 2G handset 200, MSC 202, geo-location proximity function (GLPF) 204, NSID-to-geo-location proximity descriptor database (DB) 206, HLR 208, and presence server 210. Each of these components will be described in greater detail below.

2G handset 200 may include any mobile communications handset capable of communicating over a second generation (2G) cellular network. Exemplary 2G networks include both time division multiplexed (TDMA)- and code division multiplexed (CDMA)-based networks including, but not limited to, GSM, IS-41, IS-95, IS-136, iDEN, PDC, or PCS networks.

MSC 202 includes a switch that is a component of the network switching subsystem and that connects to one or more BSCs via the A interface. The network switching subsystem (NSS) is a component of GSM networks that carries out switching functions and manages the communications between mobile phones and the public switched telephone network (PSTN). The NSS, also referred to as the GSM core network, refers to the circuit-switched core network used for traditional GSM services such as voice calls, SMS, and circuit switched data calls. Additionally, an overlay architecture on the GSM core network known as the GPRS core network provides packet-switched data services and allows mobile phones to access services, such as WAP, MMS, and the Internet. MSC 202 may be the primary service delivery node for GSM and may be responsible for handling voice calls and SMS. MSC 202 may set up and release end-to-end connections, handle mobility and hand-over during a call, take care of charging, and perform real time pre-paid account monitoring. It is appreciated that MSC 202 may include one of a gateway MSC (G-MSC), a visited MSC (V-MSC), or a mobile switching centre server (MSCS). A G-MSC is an MSC that determines which visited MSC the subscriber who is being called is currently located. A V-MSC refers to the MSC where a customer is currently located. A MSCS refers to a soft-switch variant of MSC 202 and may provide circuit-switched calling, mobility management, and GSM services to the mobile phones roaming within the area that it serves.

GLPF 204 may include a combination of hardware, software, and/or firmware for translating NSIDs or location information into geo-location proximity descriptors and providing the geo-location proximity descriptors to a presence system. In one embodiment, GLPF 204 may be co-located with or integrated with a signaling transfer point (STP) or a signaling gateway (SG). In another embodiment, GLPF 204 may be located separately from the STP/SG and may be communicatively coupled with or otherwise associated with means for intercepting mobility management messages transmitted between MSC 202 and HLR 208. NSID-to-geo-location proximity descriptor DB 206 may likewise be co-located with, integrated with, or separately located from GLPF 204.

NSID-to-geo-location proximity descriptor DB 206 may include records for translating NSIDs and geo-location data into geo-location proximity descriptors.

HLR 208 may include a logically central database that contains details of each mobile phone subscriber that is authorized to use the GSM core network. There may be several logical and physical HLRs per public land mobile network (PLMN), though one IMSI/MSISDN pair can be associated with only one logical HLR (which can span several physical nodes) at a time. The subscriber's current location stored in HLR 208 includes the VLR address currently serving the subscriber. The HLR stores details of every SIM card issued by the mobile phone operator. Each SIM has a unique identifier called an IMSI which is the primary key to each HLR record. Records in HLR 208 may also contain information associated with supplementary services, basic service subscription information, and service restrictions (e.g., roaming permissions).

Other items of data associated with the SIM are the MSISDNs, which are the telephone numbers used by mobile phones to make and receive calls. The primary MSISDN is the number used for making and receiving voice calls and SMS, but it is possible for a SIM to have other secondary MSISDNs associated with it for fax and data calls. Each MSISDN is also a primary key to the HLR record. The HLR data is stored for as long as a subscriber remains with the mobile phone operator. An example of other data stored in the HLR against an IMSI record includes data for the GSM services that the subscriber has requested or been given. GPRS settings to allow the subscriber to access packet services, current location of subscriber (VLR and serving GPRS support node/SGSN), and call divert settings applicable for each associated MSISDN.

HLR 208 receives and processes MAP transactions and messages from elements in the GSM network. For example, HLR 208 may receive and process location update messages received from mobile handsets as they roam. HLR 208 may connect to one or more of the following elements: a G-MSC for handling incoming calls, one or more VLRs for handling requests from mobile phones to attach to the network, an SMSC for handling incoming SMS, a voice mail system for delivering notifications to the mobile phone that a message is waiting, and an authentication center (AuC) for authenticating, ciphering, and exchanging triplets in GSM networks or authentication vectors in UMTS networks.

Presence server 210 may include a network entity for providing presence service. Presence service is a network service that accepts, stores, and distributes presence information. A presence service may be implemented as a single server or as multiple servers and proxies (e.g., there may be complex patterns of redirection and proxying while retaining logical connectivity to a single presence service). Also presence service may be implemented as direct communication among a presentity and watchers, i.e., a presence server is not required. Presence information is a status indicator that conveys ability and willingness of a potential communication partner to communicate.

An exemplary messaging scenario for 2G core link-based NSID interception and translation to a geo-location proximity descriptor will now be described. 2G handset 200 may send Register or Roam message 212 indicating that 2G handset has registered with the network or is currently roaming. In response, MSC 202 may generate and send a mobility management message to HLR 208. The mobility management message shown in FIG. 2 includes MAP Update_Location message 214. However, it is appreciated that other types of mobility management messages (e.g., LTE DIAMETER) may be intercepted without departing from the scope of the subject matter described herein. Other types of mobility management messages that may be intercepted include MAP Update_Location_Area, Update_general packet radio service (GPRS)_Location, MAP Insert_Subscriber_Data, and base station system mobile application part (BSSMAP)/direct transfer application part (DTAP) complete layer 3 information (CL3I) Location_Update_Request messages.

In step 216, Update_Location message 214 may be intercepted by GLPF 204 and one or more NSIDs may be extracted from Update_location message 214. The one or more NSIDs may be used to determine a geo-location descriptor by consulting NSID-to-geo-location descriptor DB 206. For example, a lookup for an NSID comprising MSC address 1110001 may produce the resulting geo-location proximity descriptor "West Chapel Hill." The geo-location proximity descriptor may then be included in a presence update message for communication to a presence system. For example, the geo-location proximity descriptor "West Chapel Hill" may be included in PresenceUpdate message 218 and communicated from GLPF 204 to presence server 210. It is appreciated that the NSID-to-geo-location proximity descriptor translation described above may not interfere with conventional mobility management operation. In other words, Update_Location message 214 may still be delivered unaltered to HLR 208 for performing conventional mobility management functions.

Figure 3:
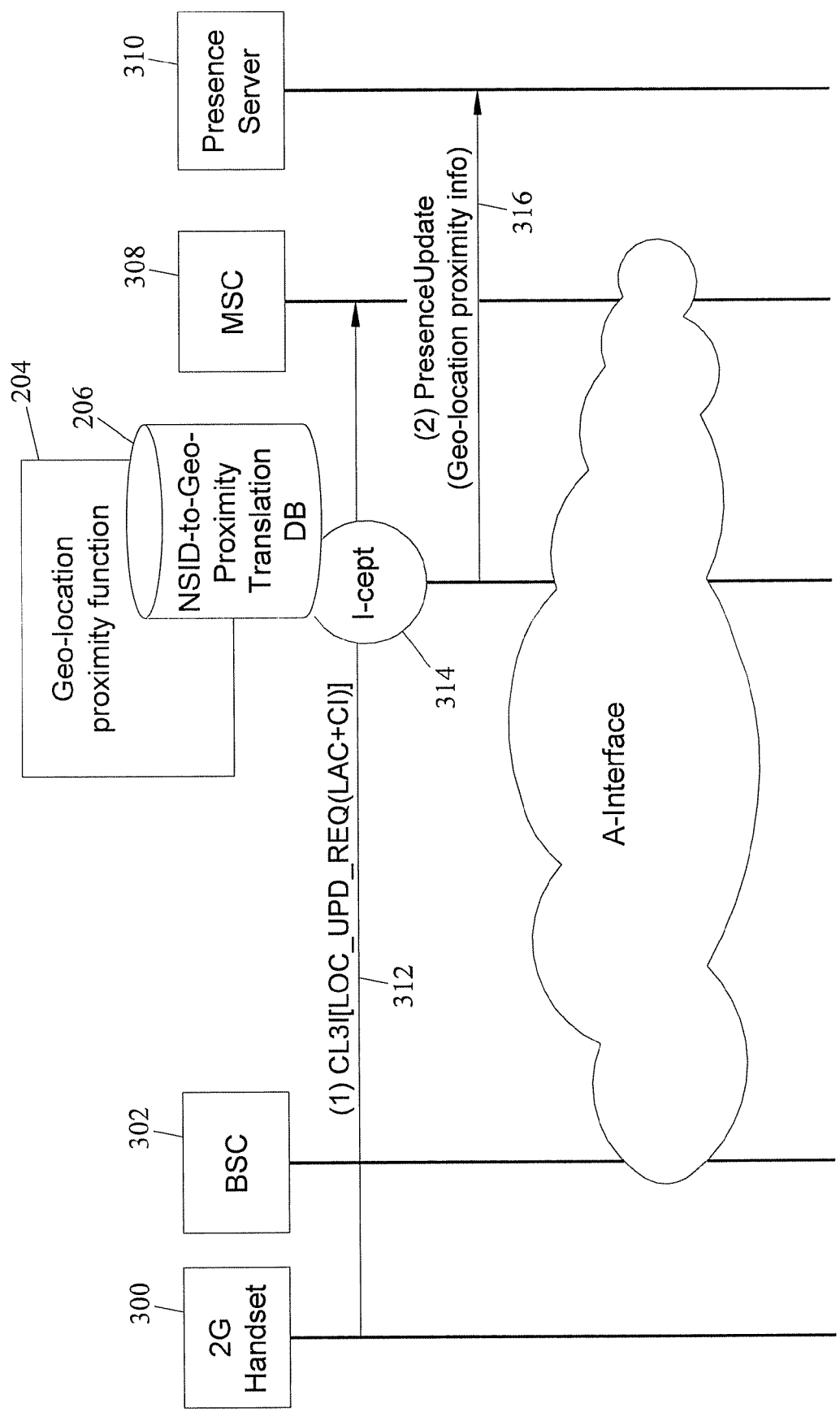
FIG. 3 is network diagram illustrating an exemplary 2 G communications network and exemplary messaging for intercepting one or more NSIDs via an A-interface, associating the one or more NSIDs to a geo-location proximity descriptor, and providing the descriptor to a presence system according to an embodiment of the subject matter described herein.

FIG. 3 is network diagram illustrating an exemplary 2 G communications network and exemplary messaging for intercepting one or more NSIDs via an A-interface, associating the one or more NSIDs with a geo-location proximity descriptor, and providing the descriptor to a presence system according to an embodiment of the subject matter described herein. Referring to FIG. 3, the exemplary 2 G communications network includes 2G handset 300, BSC 302, GLPF 204, NSID-to-geo-location proximity descriptor database (DB) 206, MSC 308, and presence server 310.

An exemplary messaging scenario for 2G A link-based NSID interception and translation to a geo-location proximity descriptor will now be described. In contrast to the embodiment shown in FIG. 2, the monitoring system shown in FIG. 3 is adapted to intercept 2G mobility management messages sent across an A-interface. For example, 2G handset 300 may trigger sending a mobility management message including BSSMAP/DTAP CL3I Location_Update_Request message 312 from BSC 302 to MSC 308. At step 314, GLPF 204 may intercept BSSMAP/DTAP CL3I Location_Update_Request message 312 and extract one or more NSIDs from BSSMAP/DTAP CL3I Location_Update_Request message 312. The one or more NSIDs may be used to determine a geo-location descriptor by consulting NSID-to-geo-location descriptor DB 206. For example, a lookup for an NSID comprising BSC address 2220002 may produce the resulting geo-location proximity descriptor "West Chapel Hill." The geo-location proximity descriptor may then be included in a presence update message for communication to a presence system. For example, the geo-location proximity descriptor "West Chapel Hill" may be included in PresenceUpdate message 316 and communicated from GLPF 204 to presence server 310. It is appreciated that the NSID-to-geo-location proximity descriptor translation described above may not interfere with conventional mobility management operation. In other words, Update_Location message 312 may still be delivered unaltered to MSC 308 for performing conventional mobility management functions. It will be appreciated that in alternate embodiments of the present invention, mobility management message interception may occur on different signaling interfaces/links. For example, in an LTE embodiment, mobility management message interception may occur on the S6 interface.

Figure 4:
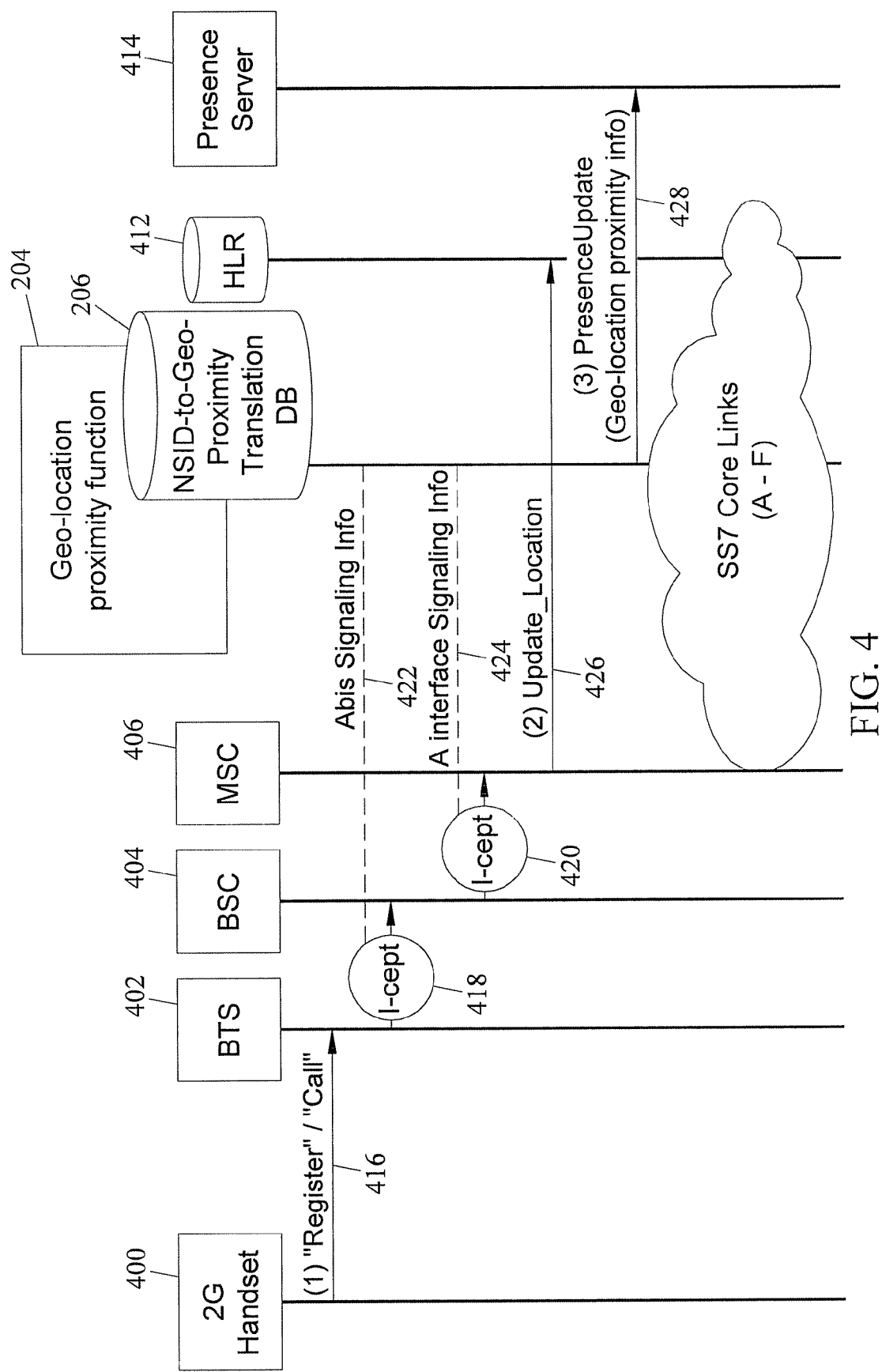
FIG. 4 is network diagram illustrating an exemplary 2 G communications network and exemplary messaging for intercepting one or more NSIDs via an A interface or an A-bis interface, associating the one or more NSIDs with a geo-location proximity descriptor, and providing the descriptor to a presence system according to an embodiment of the subject matter described herein.

FIG. 4 is network diagram illustrating an exemplary 2 G communications network and exemplary messaging for intercepting one or more NSIDs via an A interface or an A-bis interface, associating the one or more NSIDs with a geo-location proximity descriptor, and providing the descriptor to a presence system according to an embodiment of the subject matter described herein. Referring to FIG. 4, exemplary 2G mobile communications network may include 2G handset 400, BTS 402, BSC 404, MSC 406, GLPF 204, NSID-to-geo-location descriptor DB 206, HLR 412, and presence server 414.

An exemplary messaging scenario for 2G NA-bis interface-based NSID interception and translation to a geo-location proximity descriptor will now be described. 2G handset 400 may register with the network or place a call if already registered. In response, mobility management messages, such as a Location_Update_Request message, may be sent to HLR 412. However, the monitoring system shown in FIG. 4 is adapted to intercept 2G mobility management messages sent across either an A-bis or A interface. The A-bis interface includes signaling messages transmitted between BTS 402 and BSC 404. The A interface includes signaling message transmitted between BSC 404 and MSC 406. In one embodiment, monitoring and/or interception of mobility management messages transmitted over the A-bis and A interfaces may be accomplished using link probes located on the signaling link to be monitored. In another embodiment, monitoring and/or interception of mobility management messages transmitted over the A-bis and A interfaces may be accomplished using a monitoring function integrated with BTS 402 or BSC 404.

Like mentioned above with respect to FIGS. 2 and 3, the one or more NSIDs may be used to determine a geo-location descriptor by consulting NSID-to-geo-location descriptor DB 206. For example, a lookup for an NSID comprising MSC address 1110001 or BSC address 2220002 may produce the resulting geo-location proximity descriptor "West Chapel Hill." The geo-location proximity descriptor may then be included in a presence update message for communication to a presence system. For example, the geo-location proximity descriptor "West Chapel Hill" may be included in presence update message 428 and communicated from GLPF 204 to presence server 414.

In one embodiment, both "current" and "previous" NSIDs may be extracted and used by GLPF 204 to determine a current geo-location descriptor and a previous geo-location descriptor, respectively. One advantage of using multiple NSIDs which are associated with different points in time includes the ability to compute various position metrics such as a rate of change of the location of the mobile user. This will be described in greater detail with respect to FIG. 6.

Figure 5:
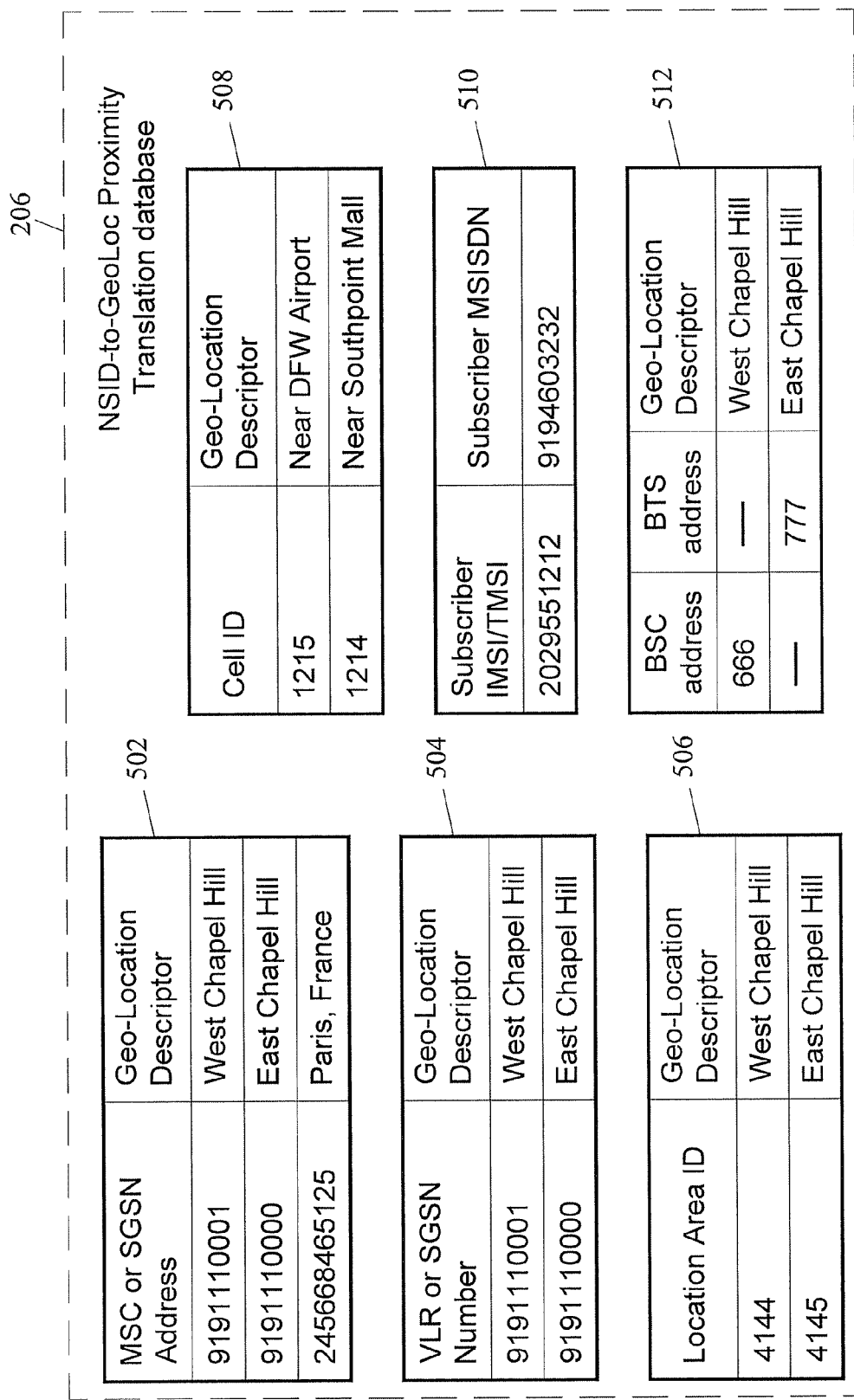
FIG. 5 is diagram of exemplary NSID-to-geo-location proximity descriptor translation database entries according to an embodiment of the subject matter described herein.

FIG. 5 is diagram of exemplary NSID-to-geo-location proximity descriptor translation database entries according to an embodiment of the subject matter described herein. Referring to FIG. 5, NSID-to-geo-location DB 206 may include a plurality of entries for associating various types of NSIDs with corresponding location descriptors. For clarity of illustrations, different types of associations are shown as separate groups, however, it is appreciated that the structure of NSID-to-geo-location DB 206 may include any suitable structure for associating NSIDs with geo-location descriptors. Returning to FIG. 5, group 502 associates an MSC or SGSN address with a corresponding geo-location descriptor. For example, in response to a lookup in the left hand column for SGSN address 9191110001, a corresponding entry in the right hand column may be determined that includes the geo-location descriptor "West Chapel Hill."

Group 504 may associate a VLR or SGSN number with a corresponding geo-location descriptor. For example, the geo-location descriptor "West Chapel Hill" may also be determined in response to a lookup in the left hand column for SGSN number 9191110001.

Group 506 may associate a Location Area ID with a geo-location descriptor. For example, the geo-location descriptor "West Chapel Hill" may be determined in response to a lookup in the left hand column for Location Area ID 4144.

Group 508 may associate one or more Cell IDs with one or more corresponding geo-location descriptors. For example, the geo-location descriptor "Near Southpoint Mall" may be determined in response to a lookup in the left hand column for Cell ID 1214.

Group 510 may associate one or more Subscriber IMSIs/TMSIs with one or more Subscriber MSISDNs. For example, MSISDN 9194603232 may be determined in response to a lookup in the left hand column for Subscriber IMSI 2029551212.

Group 512 may associate one or more BSC and/or BTS addresses with one or more geo-location descriptors. For example, the geo-location descriptor "West Chapel Hill" may be determined in response to a lookup in the left hand column for BSC address 666. Similarly, the geo-location descriptor "East Chapel Hill" may be determined in response to a lookup in the left hand column for BTS address 777.

FIG. 6 is diagram of an exemplary NSID-to-movement descriptor translation database according to an embodiment of the subject matter described herein. Referring to FIG. 6, NSID-to-movement descriptor DB 206 may include entries for associating multiple NSIDs (each NSID being associated with a different time) with a corresponding movement descriptor. For example, general subscriber movement/rate of movement information may be determined by tracking and comparing NSID values associated with a particular subscriber over time. A movement descriptor includes a word or phrase that describes an activity associated with the movement of the mobile user and is determined by a change, or rate of change, in location over time. Exemplary types of movement descriptors include "walking," "jogging," "biking," and "motoring."

Movement descriptors may be based on an examination of multiple NSIDs in order to provide a more accurate description of the movement status of a mobile subscriber. For example, by examining multiple NSIDs corresponding to different points in time a determination may be made as to whether the mobile subscriber is stationary (i.e., no NSID change over time), riding/driving in a motor vehicle (i.e., NSID changing at a rate expected for a car), walking (i.e., NSID changing at a rate that would be expected of an adult walking at a brisk pace . . . 2 mph), riding a bike, etc.).

For example, a first mobility management message associated with a mobile subscriber may be intercepted and a portion of the NSID values may be recorded. Later, a second mobility management message associated with the same mobile subscriber may be intercepted and a portion of the first and second message NSID values may be compared to determine subscriber movement/movement attributes. As shown in NSID-to-movement descriptor DB 206, row 602 may include entries indicating that a mobile user identified by Subscriber ID 9193803814 is motoring (i.e., driving or riding in a motor vehicle). For example, column 602 may indicate that at 13:15:05 on Aug. 8, 2008, the subscriber was located at a cell associated with Cell ID 1214. Because the subscriber may be currently located at a cell associated with Cell ID 1215 at 14:15:05 on Aug. 8, 2008, the rate of change of the user's location (e.g., average speed) may be determined by dividing the difference between these two locations (e.g., 1.5 miles) into the difference between the timestamps at which the location measurements were taken (e.g., 1 hour). The result may include an average speed of 1.5 mph which may be associated with jogging. A similar process may be used to determine various average speeds, which may each be associated with a movement descriptor. It is appreciated that each movement descriptor may be associated with a range of average speeds and that the range may be different for different movement descriptors. Ideally, every speed is uniquely associated with a movement descriptor (i.e., no gaps and no overlaps). However, in close cases where the speed associated with different activities may overlap, such as fast jogging and slow biking, a given speed may be associated with multiple movement descriptors.

Figure 7:
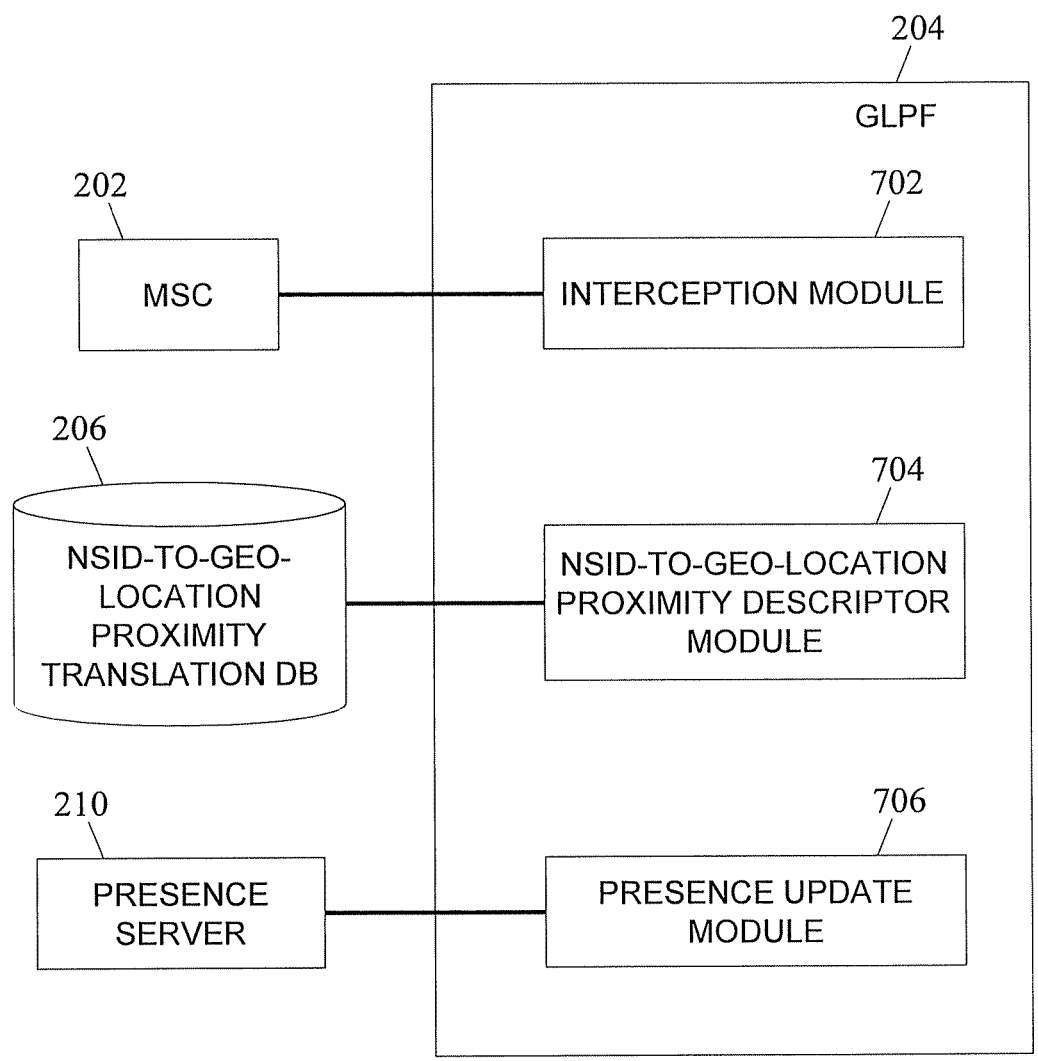
FIG. 7 is block diagram illustrating an exemplary system for associating NSID information with a geo-location proximity descriptor and providing the descriptor to a presence system according to an embodiment of the subject matter described herein.

FIG. 7 is block diagram illustrating an exemplary system for associating NSID information to a geo-location proximity descriptor and providing the descriptor to a presence system according to an embodiment of the subject matter described herein. Referring to FIG. 7, GLPF 204 may include interception module 702, NSID-to-geo-location proximity descriptor module 704, and presence update module 706.

Interception module 702 may include a combination of hardware, software, and/or firmware for translating NSIDs into geo-location proximity descriptors and. NSID-to-geo-location proximity descriptor module 704 and presence update module 706 may likewise include a combination of hardware, software, and/or firmware. In the embodiment shown in FIG. 7, modules 702-706 are included in GLPF 204 which may be co-located or integrated with, for example, an STP or SG. In another embodiment, modules 702-706 may be located separately from GLPF 204. Interception module may be associated with MSC 202 for intercepting mobility management messages associated with mobile subscribers, where mobility management messages include one or more NSIDs. For example, interception module 702 may intercept a Registration message including a Cell ID associated with the cell in which the mobile subscriber is currently located.

NSID-to-geo-location proximity descriptor module 704 may be associated with NSID-to-geo-location proximity descriptor translation database 206 for determining a geo-location proximity descriptor based on the one or more NSIDs. For example, NSID-to-geo-location proximity descriptor module 704 may perform a lookup in NSID-to-geo-location proximity descriptor translation database 206 for the Cell ID extracted from the Registration message intercepted by interception module 702. The result of the lookup may include the geo-location proximity descriptor, "near downtown."

Presence update module 706 may be associated with presence server 210 for providing determined geo-location proximity descriptors to a presence system. For example, presence update module 706 may send a presence update message including the geo-location proximity descriptor "near downtown" to presence server 210. The geo-location proximity descriptor may then be displayed to watchers of the mobile subscriber.

GPS Translation

According to another group of embodiments, a geo-location proximity function is adapted to intercept/obtain geo-location coordinate data (e.g., GPS coordinates, longitude and latitude, etc.) associated with a mobile subscriber, and to translate the geo-location coordinate data into an associated "fuzzy" geo-location proximity descriptor.

It is expected that such a "precise-to-imprecise" type location information translation will be useful in cases where a mobile subscriber does not want their exact geo-position known/made available to other "watcher" subscribers, but would like provide these watchers with some less precise/"fuzzy" geo-position information. For example, a subscriber may not want others to know his geo-position to within 10 meters, but would instead like some (or all) presence service watchers to be able to see a rough estimate of his geo-position. In other words, this invention allows a presence service subscriber to control the granularity of geo-positioning data that is served-up to other watchers by the presence system. The subject matter described herein provides a means to "fuzzy-up" precise geo-position data before it is served-up to watchers. This provides a way for a network operator/presence service operator to control the "granularity" of geo-position information made available to other presence users/subscribers by taking "precise" geo-position coordinate information associated with a mobile subscriber and translating/mapping the "precise" geo-position information into a less precise proximity descriptor, which is then provided to a presence system. Embodiments for translating location information into one or more geo-location proximity descriptors will now be described in greater detail with respect to FIGS. 8-13 below.

Figure 8:
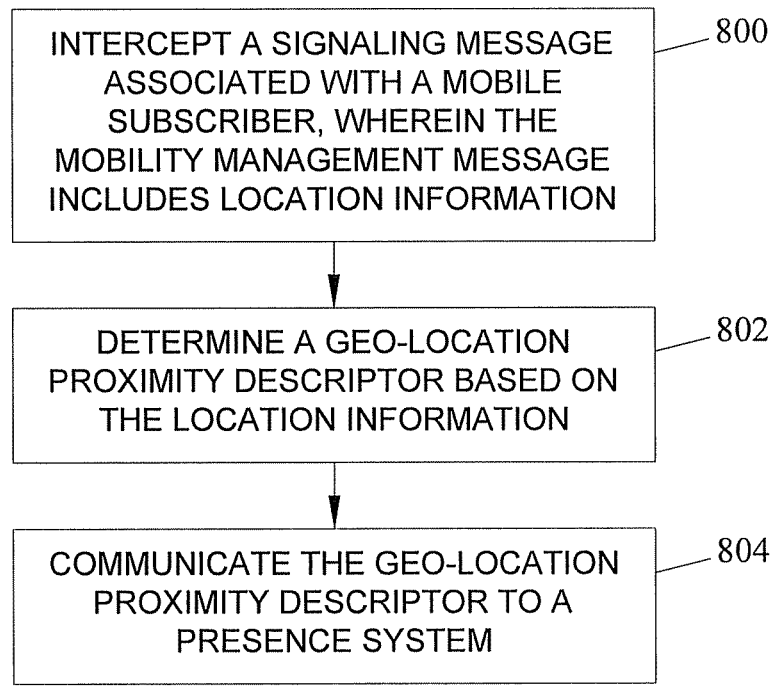
FIG. 8 is flow chart illustrating exemplary steps for associating GPS information with a geo-location proximity descriptor and providing the descriptor to a presence system according to an embodiment of the subject matter described herein.

FIG. 8 is flow chart illustrating exemplary steps for associating location information (e.g., GPS coordinates) with a geo-location proximity descriptor and providing the descriptor to a presence system according to an embodiment of the subject matter described herein. Referring to FIG. 8, in step 800, a mobility management message associated with a mobile subscriber is intercepted, where the mobility management message includes location information such as GPS coordinates. Once mapping/translation is accomplished, the determined geo-location descriptor may be communicated as presence update information to a presence system. As will be described in greater detail below with respect to the embodiments shown in FIGS. 9 and 10, the location information-to-geo-location descriptor translation may be performed alone or, additionally, a subscriber ID-to-IM address translation may be performed so that the presence update information provided to the presence system may further include an IM address. GPS information may include a pseudorandom code, ephemeris data and almanac data. The pseudorandom code is simply an ID code that identifies which satellite is transmitting information. Ephemeris data, which is constantly transmitted by each satellite, contains important information about the status of the satellite (healthy or unhealthy), current date and time. Ephemeris data is a set of parameters that can be used to accurately calculate the location of a GPS satellite at a particular point in time by describing the path that the satellite is following as it orbits Earth. To accurately calculate a location, ephemeris data is only usable for a limited time (e.g., a few hours or less). Up-to-date data is needed to minimize error that results from minor variations in a satellite's orbit. Almanac data tells the GPS receiver where each GPS satellite should be at any time throughout the day. Each satellite transmits almanac data showing the orbital information for that satellite and for every other satellite in the system.

In step 802, a geo-location proximity descriptor is determined based on the one or more NSIDs. For example, SGSN address 9191110001 may be associated with geo-location proximity descriptor "West Chapel Hill" or Cell ID 1214 may be associated with geo-location proximity descriptor "near Southpoint Mall." As a result, NSIDs, which have no meaning to a watching presentity and which are not provided to a presence system, may be translated into a format usable by a presence system. It is understood that NSIDs may not provide a precise geographic location of a mobile user, but rather may indicate an imprecise geographic area in which the mobile user may be found. This may be referred to herein as a "fuzzy" location and both the one or more NSIDs and the determined geo-location proximity descriptor are fuzzy in this sense. Thus, in step 802, a translation may be performed between a first type of fuzzy data (i.e., one or more NSIDs) and a second type of fuzzy data (geo-location proximity descriptor).

In step 804, the geo-location proximity descriptor is communicated to a presence system. For example, a Presence Update message including the geo-location proximity descriptor determined in step 802 may be communicated to a presence server. Because the geo-location proximity descriptor included in the presence update message is understandable by the presence server, the presence server may indicate that the location of mobile user associated with the mobility management message intercepted in step 800 is "West Chapel Hill" or "near Southpoint Mall."

Figure 9:
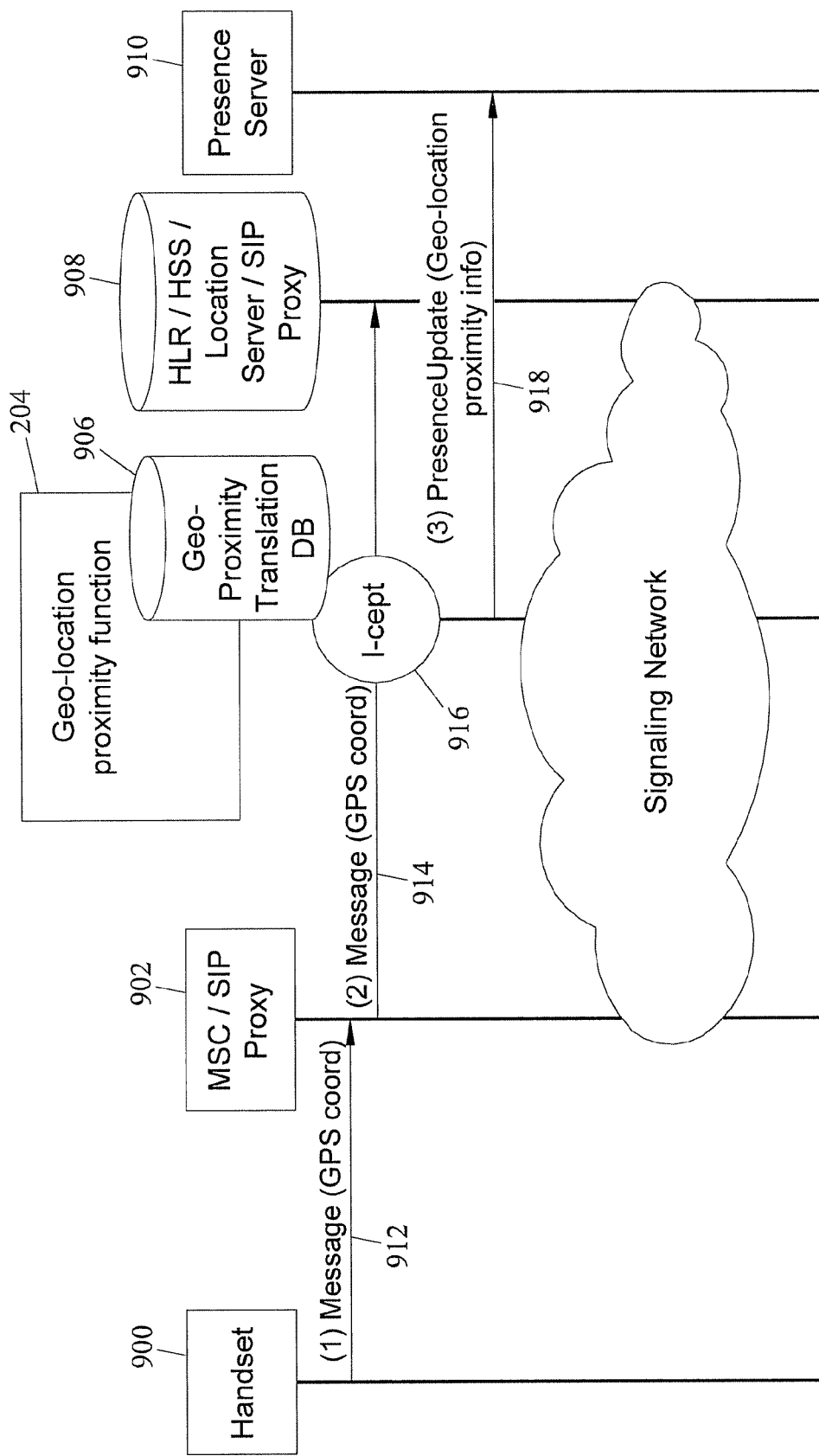
FIG. 9 is network diagram illustrating an exemplary communications network and exemplary messaging for intercepting GPS data and associating the GPS data with a geo-location proximity descriptor and providing the descriptor to a presence system according to an embodiment of the subject matter described herein.

FIG. 9 is network diagram illustrating an exemplary communications network and exemplary messaging for intercepting location information, associating the location information with a geo-location proximity descriptor, and providing the descriptor to a presence system according to an embodiment of the subject matter described herein. Referring to FIG. 9, the exemplary communications system may include handset 900, MSC/SIP proxy 902, GLPF 904, geo-location translation DB 906, location information management entity 908, and presence server 910.

Handset 900 may include any suitable GPS-enabled mobile handset capable of determining a geographic location (e.g., coordinates) of the mobile handset. For example, handset 900 may include an iPhone mobile handset manufactured by Apple, Inc. of Cupertino, Calif. including a GPS receiver chipset for receiving GPS signals and determining a longitude and latitude of handset 900.

MSC/SIP proxy 902 may include a network entity for receiving location information messages from mobile handset 900. For example, MSC/SIP proxy 902 may include may include any communications device associated with the network switching subsystem that connects to one or more BSCs via the A interface such as MSC 202 described above with respect to FIG. 2. Alternatively, or additionally, MSC/SIP proxy 902 may include a SIP proxy server. According to RFC 3261, which is incorporated by reference herein in its entirety, a proxy server is an intermediary entity that acts as both a server and a client for the purpose of making SIP requests on behalf of other clients. A SIP proxy server routes requests to another entity closer to the targeted user. SIP proxies may also enforce policy (for example, making sure a user is allowed to make a call) and may interpret, and, if necessary, rewrites specific parts of a request message before forwarding it.

GLPF 204 may include hardware or a combination of hardware and software and/or firmware for translating NSIDs or location information into geo-location proximity descriptors and providing the geo-location proximity descriptors to a presence system. GLPF 204 may be communicatively coupled with or otherwise associated with means for intercepting location update messages transmitted between MSC 202 and HLR 208. NSID-to-geo-location proximity descriptor DB 206 may likewise be co-located with, integrated with, or separately located from GLPF 204. GLPF 204 may be integrated with/co-located with/associated with an STP, SS7-IP Gateway, SS7-SIP Gateway, a SIP Proxy, a SIP signaling router, a softswitch, an MGC, a presence server, etc. The GLPF may also be implemented via a probe-based network monitoring system. In one embodiment, GLPF functionality may be split among one or more network nodes. For example, a message intercept/copy function may be associated with a routing node (e.g., STP, SIP Signaling Router, DIAMETER router, etc.), while the translation/mapping function may be associated with a presence server or HSS node.

Geo-location translation DB 906 may include entries for associating location information (e.g., GPS coordinates) with a corresponding geo-location descriptor. For example, the current position of a mobile subscriber may be expressed as a longitude and latitude. This location information may be used to search DB 906 for a corresponding location descriptor. It is appreciated that multiple coordinates may be associated with the same geo-location descriptor because the mobile subscriber may not wish to broadcast his or her precise location as a presence update. For example, if the mobile user's coordinates indicate that he or she is located on an isolated stretch of a jogging trail downtown, the user may not wish for that information to be disclosed for security reasons. Instead, the user may configure the system to translate all coordinates within several square miles of the jogging trail to the descriptor "downtown" so that watchers have only a general idea of the user's location. Or, if the user wished to be vaguer about his or her location, DB 906 may translate all coordinates corresponding to locations within the USA with the descriptor "USA."

Location information management entity 908 may include an HLR, home subscriber server (HSS), DIAMETER server, location server, SIP proxy, or any other suitable database or server for managing location information. In the example shown in FIG. 9, location information management entity 908 receives location information messages such as GPS coordinates, from MSC/SIP proxy 902.

Presence server 910 may include a network entity for providing presence service, such as presence server 210 described above with respect to FIG. 2.

An exemplary messaging scenario for intercepting and translating location information into a geo-location proximity descriptor and providing the geo-location proximity descriptor to a presence server will now be described below. Initially, handset 900 may transmit GPS information to MSC/SIP proxy 902 in message 912. MSC/SIP proxy 902 may transmit message 914 including the GPS information to location information management entity 908. However, at step 916, GLPF 204 may intercept message 914, extract the GPS information from the message, and translate the GPS information into a geo-location proximity descriptor. For example, GPS-to-location descriptor translation may include consulting geo-location translation DB 906, exemplary entries of which are described with respect to FIG. 11 below.

The geo-location proximity descriptor may then be provided to presence server 910 in presence update message 918 by GLPF 204.

In a manner similar to that described with respect to the previous embodiment, a geo-location proximity function of the present invention is adapted to maintain a geo-position log/history information associated with a mobile subscriber such that mobile subscriber change-of-position/movement characteristics may be calculated over time. In this embodiment, the change-of-position characteristics may be calculated using the more precise geo-position information that is intercepted (e.g., GPS information, longitude, latitude). Once this change-of-position/movement calculation is performed, the resulting movement characteristics are translated/mapped to a movement descriptor. Exemplary movement descriptors may include: walking, jogging, stationary, biking, motoring, etc. Movement descriptor information may then be communicated as presence update information to a presence system.

Figure 10:
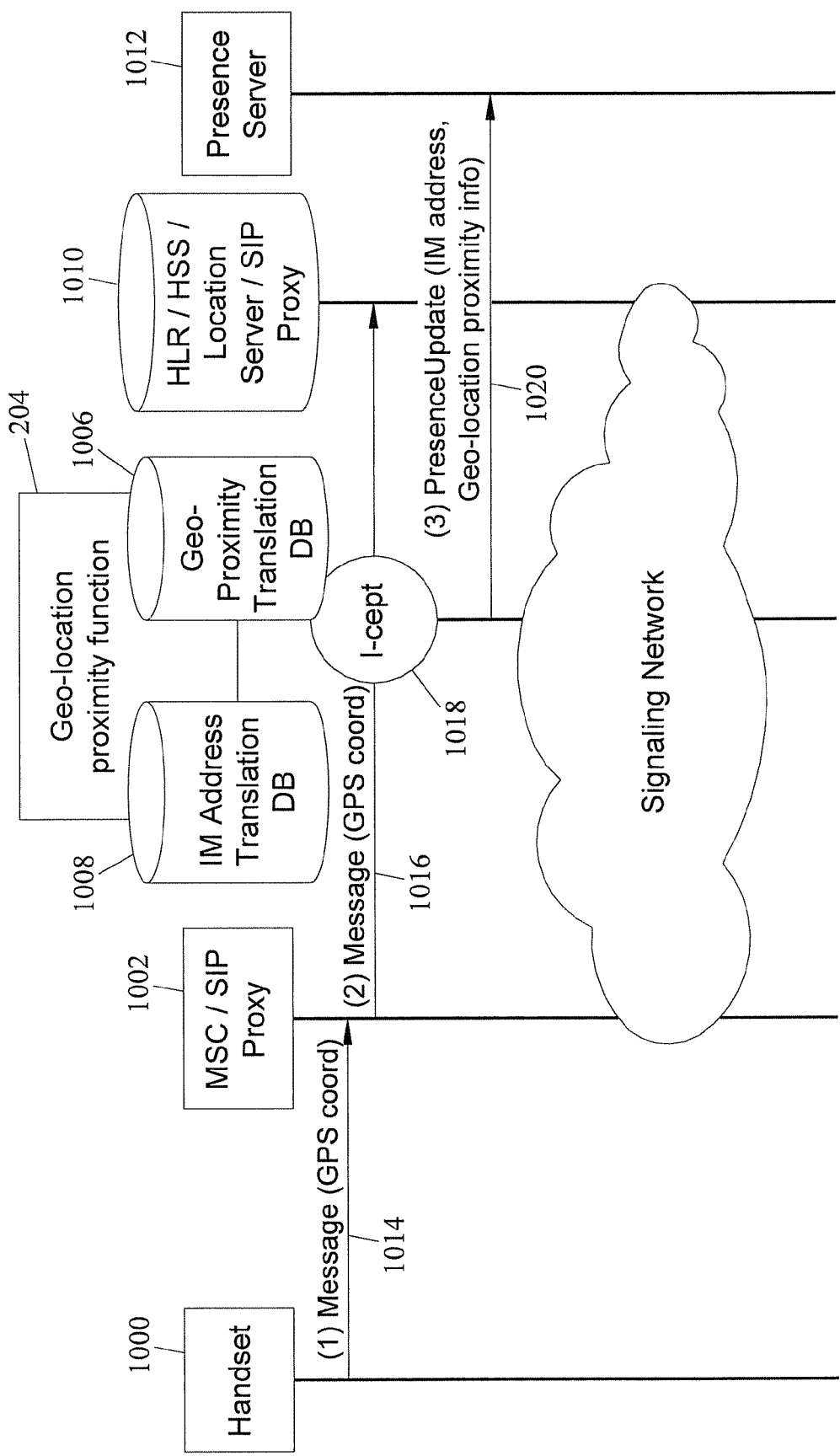
FIG. 10 is network diagram illustrating an exemplary communications network and exemplary messaging for GPS data-to-geo-location proximity descriptor and MSISDN-to-IM address mapping according to an embodiment of the subject matter described herein.

FIG. 10 is network diagram illustrating an exemplary communications network and exemplary messaging for location information-to-geo-location proximity descriptor and MSISDN-to-IM address mapping according to an embodiment of the subject matter described herein. Referring to FIG. 10, the exemplary communications system may include GPS-enabled handset 1000, MSC/SIP proxy 1002, GLPF 204, geo-location translation DB 1006, MSISDN-to-IM address translation DB 1008, location information management entity 1010, and presence server 1012. In contrast to the embodiment shown in FIG. 9, FIG. 10 includes IM address translation DB 1008 for translating an MSISDN to an IM address so that the presence update sent to the presence system may also include the IM address associated with the mobile subscriber.

Referring to the exemplary scenario shown in FIG. 10, handset 1000 may send location information message 1014 including GPS coordinates of handset 1000 to MSC/SIP proxy 1002. MSC/Sip proxy 1002 may then forward location information message 1016 to location information management entity 1010. However, GLPF 204 may intercept message 1016, at step 1018, before reaching location information management entity 1010 and perform two (rather than just one) translations. The first translation may include translating the location information included in intercepted message 1016 into a geo-location proximity descriptor. This may be accomplished by searching geo-proximity translation DB 1006. The second translation may include translating the MSISDN included in message 1016 into an IM address. This may be accomplished by searching MSISDN-to-IM address translation DB 1008. Message 1016 may be forwarded to location information management entity 1010 as normal. Presence update message 1020 including the determined geo-location proximity descriptor and IM address may be sent to presence server 1012.

Figure 11:
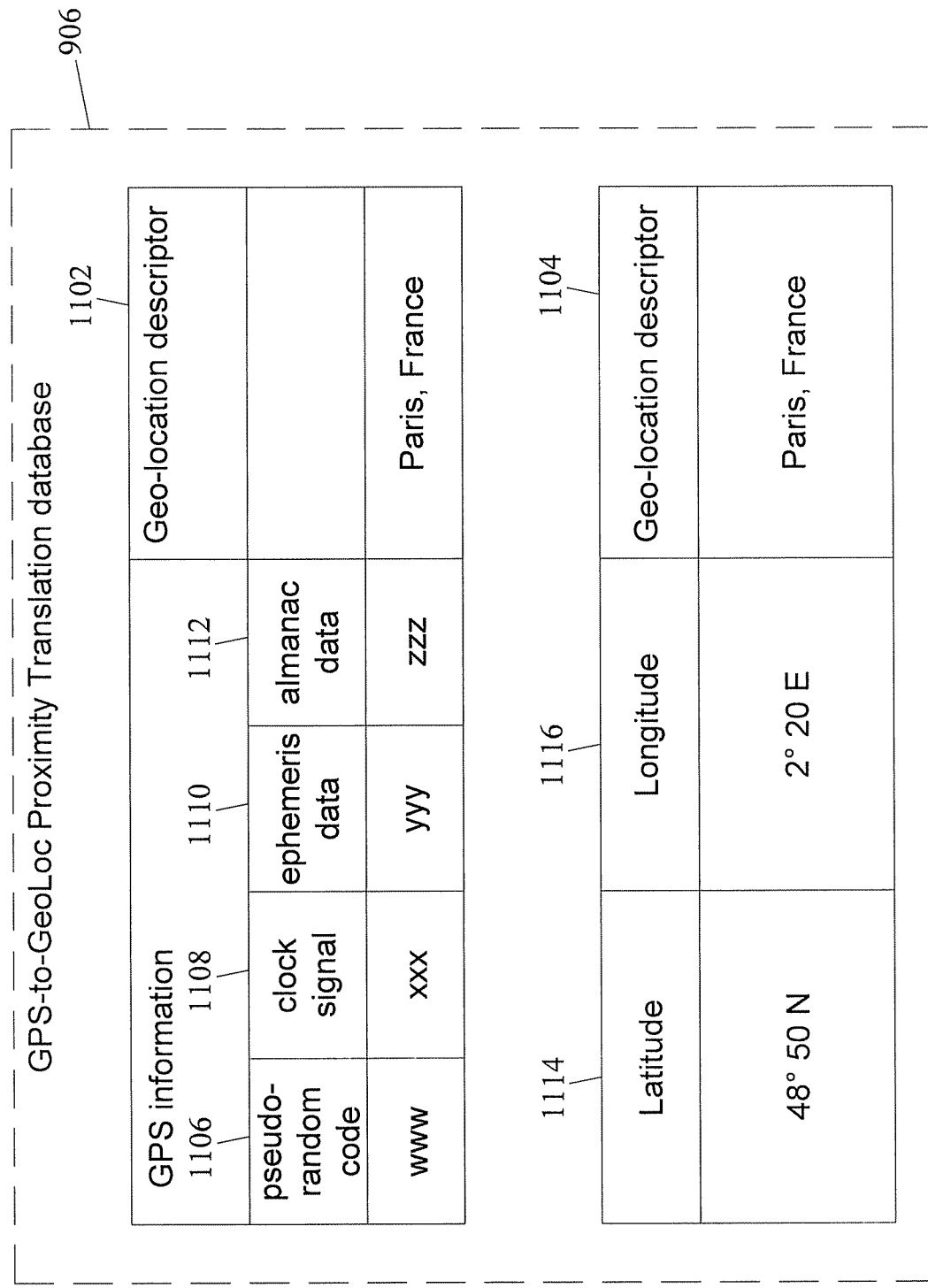
FIG. 11 is diagram of exemplary GPS-to-geo-location proximity descriptor translation database entries according to an embodiment of the subject matter described herein.

FIG. 11 is diagram of an exemplary location information-to-geo-location proximity descriptor translation database according to an embodiment of the subject matter described herein. Referring to FIG. 11, location information-to-geo-location proximity descriptor translation DB 906 may include a raw GPS information translation data structure 1102 and a longitude/latitude translation data structure 1104.

Raw GPS information translation data structure 1102 may include raw GPS information provided by one or more GPS satellites such as pseudorandom code 1106, clock signal 1108, ephemeris data 1110, and almanac data 1112. In the example entry shown in FIG. 11, as pseudo-random code 1106, clock signal 1108, ephemeris data 1110, and almanac data 1112 are abbreviated as <WWW, XXX, YYY, ZZZ> for simplicity of illustration because it is understood that the formatting of actual raw GPS data may be long and cumbersome to show. Suffice it to say that the raw GPS information <WWW, XXX, YYY, ZZZ> may be associated with geo-location descriptor Paris, France, for example.

Latitude/longitude translation data structure 1104 may include entries for associating various combinations of latitudes 1114 and longitudes 1116 with geo-location proximity descriptors. For example, latitude 48° 50N and longitude 2° 20E may also correspond to the geo-location proximity descriptor Paris, France.

Figure 12:
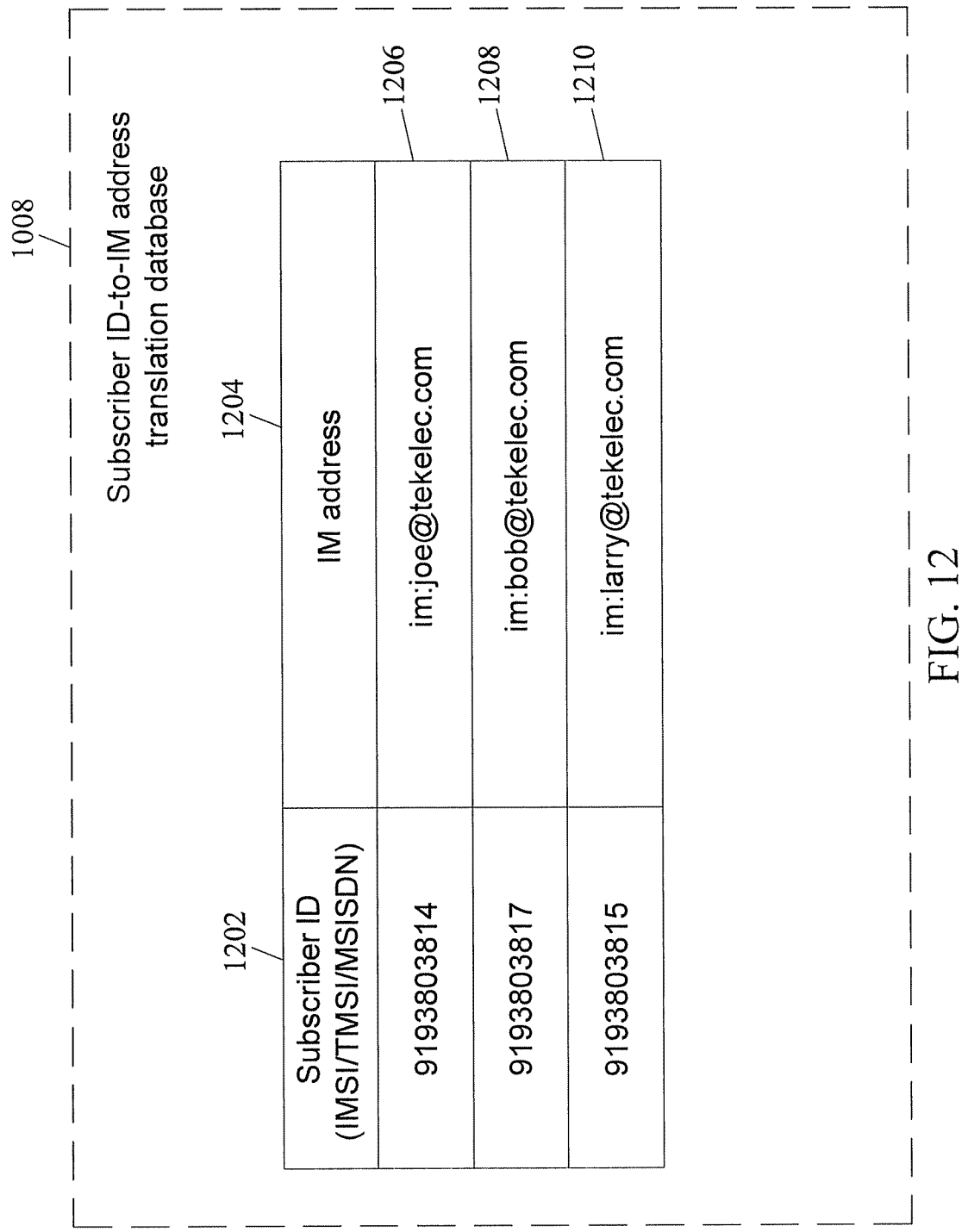
FIG. 12 is diagram of exemplary MSISDN-to-IM address translation database entries according to an embodiment of the subject matter described herein.

FIG. 12 is diagram of exemplary MSISDN-to-IM address translation database entries according to an embodiment of the subject matter described herein. Referring to FIG. 12, MSISDN-to-IM address translation database 1008 may include a plurality of subscriber IDs such as IMSIs, TMSIs, or MSISDNs in column 1202 and a plurality of corresponding IM addresses in column 1204. IM addresses may be expressed as a uniform resource locator. A URI indicates an address of the originator and follows the format <service type:username@domain>. For example, From: <im: joe@tekelec.com>. As shown in FIG. 12, entry 1206 indicates that the result of a lookup for MSISDN 9193803814 in column 1202 will be <im:joe@tekelec.com>. Similarly, entries 1208 and 1210 indicate that lookups for MSISDNs 9193803817 and 9193803815 will result in IM addresses <im:bob@tekelec.com> and <im:larry@tekelec.com>, respectively.

It is appreciated that numerous instant messaging protocols exist and little interoperability between IM services based on these protocols has been achieved. Common Profile for Instant Messaging (CPIM) defines common semantics and data formats for instant messaging to facilitate the creation of gateways between instant messaging services. CPIM is defined in request for comments (RFC) 3860, instant messaging is defined in RFC 2778, and the CPIM Message Format is defined in RFC 3862, each of which are incorporated by reference herein in their entireties.

Figure 13:
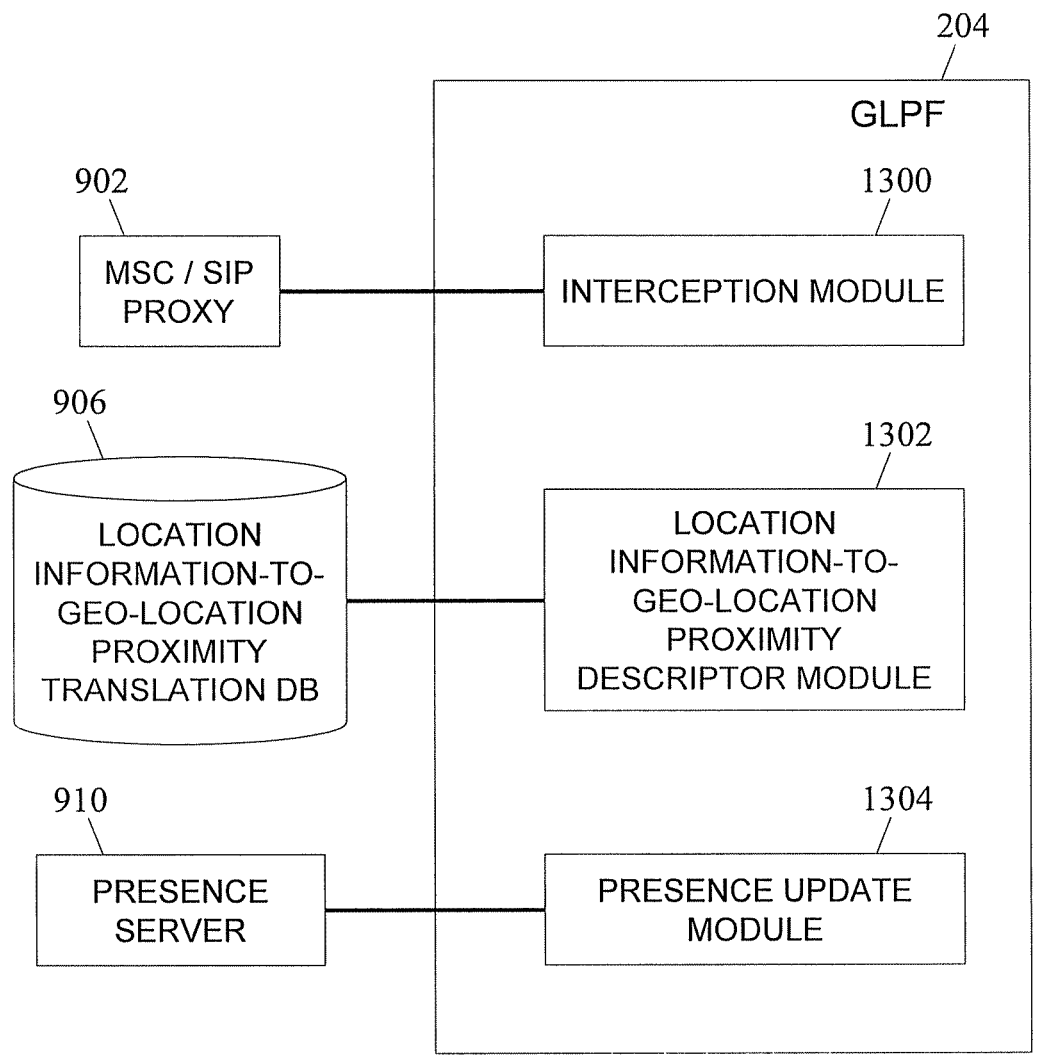
FIG. 13 is block diagram illustrating an exemplary system for associating GPS information to a geo-location proximity descriptor and providing the descriptor to a presence system according to an embodiment of the subject matter described herein.

FIG. 13 is block diagram illustrating an exemplary system for associating GPS information to a geo-location proximity descriptor and providing the descriptor to a presence system according to an embodiment of the subject matter described herein. Referring to FIG. 7, GLPF 204 may include interception module 1300, location information-to-geo-location proximity descriptor module 1302, and presence update module 1304.

Interception module 1300 may include hardware or a combination of hardware and software and/or firmware for translating NSIDs into geo-location proximity descriptors and location information-to-geo-location proximity descriptor module 1302 and presence update module 1304 may likewise include hardware or a combination of hardware, software, and/or firmware. In the embodiment shown in FIG. 13, modules 1300-1304 are included in GLPF 204. Additionally, GLPF 204 may be co-located with or integrated with an STP or SSR, or in another embodiment, modules 1300-1304 may be located separately from an STP/SSR. Interception module may be associated with MSC/SIP proxy 902 for intercepting signaling messages associated with mobile subscribers, where the signaling messages include location information. For example, interception module 1300 may intercept a message including GPS coordinates (e.g., latitude and longitude) indicating the current position of the mobile subscriber.

Location information-to-geo-location proximity descriptor module 1302 may be associated with location information-to-geo-location proximity descriptor translation database 906 for determining a geo-location proximity descriptor based on the location information. For example, location information-to-geo-location proximity descriptor module 1302 may perform a lookup in location information-to-geo-location proximity descriptor translation database 906 for the GPS coordinates extracted from the signaling message intercepted by interception module 1300. The result of the lookup may include the geo-location proximity descriptor, "near downtown."

Presence update module 1304 may be associated with presence server 910 for providing determined geo-location proximity descriptors to a presence system. For example, presence update module 1304 may send a presence update message including the geo-location proximity descriptor "near downtown" to presence server 910. The geo-location proximity descriptor may then be displayed to watchers of the mobile subscriber.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing geo-location proximity updates to a presence system, the method comprising:
   intercepting a mobility management message associated with a mobile subscriber, wherein the mobility management message includes one or more network specific identifiers (NSIDs);
   determining, based on the one or more NSIDs, a geo-location proximity descriptor; and
   communicating a presence update message including the geo-location proximity descriptor to a presence server in a presence system, wherein the presence server stores presence information associated with the mobile subscriber, wherein the presence information includes a status indicator that conveys an ability and willingness of the mobile subscriber to communicate with at least one presence service watcher that is subscribed to receive the presence information associated with the mobile subscriber, wherein intercepting the mobility management message includes intercepting the mobility management message on one of a core signaling link interface, an A-interface, and an A-bis interface.

2. The method of claim 1 wherein intercepting the mobility management message includes intercepting one of a MAP Update_Location, MAP Update_Location_Area, Update_general packet radio service (GPRS)_Location, MAP Insert_Subscriber_Data, and base station system mobile application part (BSSMAP)/direct transfer application part (DTAP) complete layer 3 information (CL3I) Location_Update_Request message.

3. The method of claim 1 wherein the one or more NSIDs includes one or more of an mobile switching center (MSC) address, visitor location register (VLR) number, serving general packet radio service (GPRS) support node (SGSN) address, SGSN number, Target Location ID, location area code (LAC), and a Cell ID.

4. The method of claim 1 wherein intercepting the mobility management message includes intercepting mobility management messages using one of a link probe and a motoring system integrated with one of a BTS and a BSC.

5. The method of claim 1 wherein determining the geo-location proximity descriptor includes determining one of a city, a state, a country, a city-region, and a proximal landmark reference.

6. The method of claim 5 wherein the city-region includes one of downtown, midtown, north-city-region, south-city-region, east-city-region, and west-city-region, wherein the city-region includes the name of the city-region.

7. The method of claim 5 wherein the proximal landmark reference includes near-landmark, wherein the landmark includes the name of the landmark.

8. The method of claim 1 comprising intercepting two or more mobility management messages at different times, extracting two or more NSIDs from the two or more mobility management messages, the two or more NSIDs being associated with different times, and determining a rate of change of location based on the two or more NSIDs.

9. The method of claim 8 comprising determining a movement descriptor based on the determined rate of change of location.

10. The method of claim 8 wherein determining the movement descriptor includes determining one of stationary, walking, jogging, biking, and driving.

11. The method of claim 1 comprising adjusting the precision of the geo-location descriptor.

12. A system for providing geo-location proximity updates to a presence system, the system comprising:
   an interception module for intercepting a mobility management message associated with a mobile subscriber, wherein the mobility management message includes one or more network specific identifiers (NSIDs);
   a NSID-to-geo-location proximity descriptor translation module for determining, based on the one or more NSIDs, a geo-location proximity descriptor; and a presence update module for communicating a presence update message including the geo-location proximity descriptor to a presence server in a presence system, wherein the presence server stores presence information associated with the mobile subscriber, wherein the presence information includes a status indicator that conveys an ability and willingness of the mobile subscriber to communicate with at least one presence service watcher that is subscribed to receive the presence information associated with the mobile subscriber, wherein the interception module is configured to intercept the mobility management message on one of a core signaling link interface, an A-interface, and an A-bis interface.

13. The system of claim 12 wherein the interception module is configured to intercept one of a MAP Update_Location, MAP Update_Location_Area, Update_general packet radio service (GPRS)_Location, MAP Insert_Subscriber_Data, and base station system mobile application part (BSSMAP)/direct transfer application part (DTAP) complete layer 3 information (CL3I) Location_Update_Request message.

14. The system of claim 12 wherein the one or more NSIDs includes one or more of an mobile switching center (MSC) address, visitor location register (VLR) number, serving general packet radio service (GPRS) support node (SGSN) address, SGSN number, Target Location ID, location area code (LAC), and a Cell ID.

15. The system of claim 12 wherein the interception module is configured to intercept mobility management messages using one of a link probe and a motoring system integrated with one of a BTS and a BSC.

16. The system of claim 12 wherein the NSID-to-geo-location proximity descriptor translation module is configured to determine one of a city, a state, a country, a city-region, and a proximal landmark reference.

17. The system of claim 16 wherein the city-region includes one of downtown, midtown, north-city-region, south-city-region, east-city-region, and west-city-region, wherein the city-region includes the name of the city-region.

18. The system of claim 16 wherein the proximal landmark reference includes near-landmark, wherein the landmark includes the name of the landmark.

19. The system of claim 12 the interception module is configured to intercept two or more mobility management messages at different times, extracting two or more NSIDs from the two or more mobility management messages, the two or more NSIDs being associated with different times, and the NSID-to-geo-location proximity descriptor translation module is configured to determine a rate of change of location based on the two or more NSIDs.

20. The system of claim 19 the NSID-to-geo-location proximity descriptor translation module is configured to determine a movement descriptor based on the determined rate of change of location.

21. The system of claim 19 wherein the movement descriptor includes determining one of stationary, walking, jogging, biking, and driving.

22. The system of claim 12 wherein the NSID-to-geo-location proximity descriptor translation module is configured to adjust the precision of the geo-location descriptor.

23. A non-transitory computer readable medium having stored thereon executable instructions that when executed by the processor of a computer performed steps comprising:

intercepting a mobility management message associated with a mobile subscriber, wherein the mobility management message includes one or more network specific identifiers (NSIDs);

determining, based on the one or more NSIDs, a geo-location proximity descriptor; and communicating a presence update message including the geo-location proximity descriptor to a presence server in a presence system, wherein the presence server stores presence information associated with the mobile subscriber, wherein the presence information includes a status indicator that conveys an ability and willingness of the mobile subscriber to communicate with at least one presence service watcher that is subscribed to receive the presence information associated with the mobile subscriber, wherein intercepting the mobility management message includes intercepting the mobility management message on one of a core signaling link interface, an A-interface, and an A-bis interface.

24. A method for providing geo-location proximity updates to a presence system, the method comprising:

intercepting a signaling message associated with a mobile subscriber, where the signaling message includes location information;

determining, based on the location information, a geo-location proximity descriptor; and communicating a presence update message including the geo-location proximity descriptor to a presence server in a presence system, wherein the presence server stores presence information associated with the mobile subscriber, wherein the presence information includes a status indicator that conveys an ability and willingness of the mobile subscriber to communicate with at least one presence service watcher that is subscribed to receive the presence information associated with the mobile subscriber, wherein intercepting the signaling message includes intercepting the signaling message on one of a core signaling link interface, an A-interface, and an A-bis interface.

25. The method of claim 24 wherein intercepting the signaling message includes intercepting a location update message.

26. The method of claim 24 wherein the location information includes one or more of global positioning system (GPS) coordinates, longitude, and latitude.

27. The method of claim 24 wherein intercepting the signaling message includes intercepting signaling messages using one of a link probe and a motoring system integrated with one of an MSC and a SIP proxy.

28. The method of claim 24 wherein determining the geo-location proximity descriptor includes determining one of a city, a state, a country, a city-region, and a proximal landmark reference.

29. The method of claim 28 wherein the city-region includes one of downtown, midtown, north-city-region, south-city-region, east-city-region, and west-city-region, wherein the city-region includes the name of the city-region.

30. The method of claim 28 wherein the proximal landmark reference includes near-landmark, wherein the landmark includes the name of the landmark.

31. The method of claim 24 comprising intercepting two or more signaling messages corresponding to different times, extracting two or more global positioning system (GPS) coordinates from the two or more signaling messages, the two or more GPS coordinates being associated with the different times, and determining a rate of change of location based on the two or more GPS coordinates.

32. The method of claim 31 comprising determining a movement descriptor based on the determined rate of change of location.

33. The method of claim 31 wherein determining the movement descriptor includes determining one of stationary, walking, jogging, biking, and driving.

34. The method of claim 24 comprising adjusting the precision of the geo-location descriptor.

35. The method of claim 34 wherein adjusting the precision includes translating from a precise location to a less precise location descriptor.

36. A system for providing geo-location proximity updates to a presence system, the system comprising:
    an interception module for intercepting a signaling message associated with a mobile subscriber, wherein the signaling message includes location information;
    a location information-to-geo-location proximity descriptor translation module for determining, based on the location information, a geo-location proximity descriptor; and
    a presence update module for communicating a presence update message including the geo-location proximity descriptor to a presence server in a presence system, wherein the presence server stores presence information associated with the mobile subscriber, wherein the presence information includes a status indicator that conveys an ability and willingness of the mobile subscriber to communicate with at least one presence service watcher that is subscribed to receive the presence information associated with the mobile subscriber, wherein the presence update module is configured to intercept the signaling message on one of a core signaling link interface, an A-interface, and an A-bis interface.

37. The system of claim 36 wherein the interception module is configured to intercept a location update message.

38. The system of claim 36 wherein the location information includes one or more of global positioning system (GPS) coordinates, longitude, and latitude.

39. The system of claim 36 wherein the interception module is configured to intercept the signaling messages using one of a link probe and a motoring system integrated with one of an MSC and a SIP proxy.

40. The system of claim 36 wherein the location information-to-geo-location proximity descriptor translation module is configured to determine one of a city, a state, a country, a city-region, and a proximal landmark reference.

41. The system of claim 40 wherein the city-region includes one of downtown, midtown, north-city-region, south-city-region, east-city-region, and west-city-region, wherein the city-region includes the name of the city-region.

42. The system of claim 40 wherein the proximal landmark reference includes near-landmark, wherein the landmark includes the name of the landmark.

43. The system of claim 36 wherein the interception module is configured to intercept two or more signaling messages corresponding to different times, extract two or more global positioning system (GPS) coordinates from the two or more signaling messages, the two or more GPS coordinates being associated with the different times, and wherein the location information-to-geo-location proximity descriptor translation module is configured to determine a rate of change of location based on the two or more GPS coordinates.

44. The system of claim 43 comprising determining a movement descriptor based on the determined rate of change of location.

45. The system of claim 43 wherein the location information-to-geo-location proximity descriptor translation module is configured to determine a movement descriptor including one of stationary, walking, jogging, biking, and driving.

46. The system of claim 36 wherein the precision of the geo-location descriptor is adjustable.

47. The system of claim 46 wherein adjusting the precision includes translating from a precise location to a less precise location descriptor.

48. A non-transitory computer readable medium having stored thereon executable instructions that when executed by the processor of a computer performed steps comprising:
    intercepting a signaling message associated with a mobile subscriber, where the mobility management message includes location information;
    determining, based on the location information, a geo-location proximity descriptor; and
    communicating a presence update message including the geo-location proximity descriptor to a presence server in a presence system, wherein the presence server stores presence information associated with the mobile subscriber, wherein the presence information includes a status indicator that conveys an ability and willingness of the mobile subscriber to communicate with at least one presence service watcher that is subscribed to receive the presence information associated with the mobile subscriber, wherein intercepting the signaling message includes intercepting the signaling message on one of a core signaling link interface, an A-interface, and an A-bis interface.

* * * * *